(12) United States Patent
Marks et al.

(10) Patent No.: US 11,663,798 B2
(45) Date of Patent: May 30, 2023

(54) SYSTEM AND METHOD FOR MANIPULATING TWO-DIMENSIONAL (2D) IMAGES OF THREE-DIMENSIONAL (3D) OBJECTS

(71) Applicant: Mitsubishi Electric Research Laboratories, Inc., Cambridge, MA (US)

(72) Inventors: Tim Marks, Newton, MA (US); Safa Medin, Cambridge, MA (US); Anoop Cherian, Cambridge, MA (US); Ye Wang, Andover, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 27 days.

(21) Appl. No.: 17/450,744

(22) Filed: Oct. 13, 2021

(65) Prior Publication Data
US 2023/0112302 A1 Apr. 13, 2023

(51) Int. Cl.
*G06T 19/20* (2011.01)
*G06T 13/80* (2011.01)
*G06T 1/20* (2006.01)
*G06T 13/40* (2011.01)
*G06V 10/94* (2022.01)

(52) U.S. Cl.
CPC .......... *G06T 19/20* (2013.01); *G06T 1/20* (2013.01); *G06T 13/40* (2013.01); *G06T 13/80* (2013.01); *G06V 10/95* (2022.01); *G06T 2219/2024* (2013.01)

(58) Field of Classification Search
None
See application file for complete search history.

(56) References Cited

U.S. PATENT DOCUMENTS

2021/0279952 A1* 9/2021 Chen .................. G06T 15/10
2022/0284646 A1* 9/2022 Saha .................. G06T 11/001

OTHER PUBLICATIONS

Chen et al., DR-Net: A Novel Generative Adversarial Network for Single Image Deraining, Wiley Dec. 31, 2018, 1-14 (Year: 2018).*

* cited by examiner

*Primary Examiner* — Robert J Craddock
(74) *Attorney, Agent, or Firm* — Gennadiy Vinokur; Hironori Tsukamoto

(57) ABSTRACT

Present disclosure discloses an image processing system and method for manipulating two-dimensional (2D) images of three-dimensional (3D) objects of a predetermined class (e.g., human faces). A 2D input image of a 3D object of the predetermined class is manipulated by manipulating physical properties of the 3D object, such as a 3D shape of the 3D input object, an albedo of the 3D input object, a pose of the 3D input object, and lighting illuminating the 3D input object. The physical properties are extracted from the 2D input image using a neural network that is trained to reconstruct the 2D input image. The 2D input image is reconstructed by disentangling the physical properties from pixels of the 2D input image using multiple subnetworks. The disentangled physical properties produced by the multiple subnetworks are combined into a 2D output image using a differentiable renderer.

20 Claims, 12 Drawing Sheets

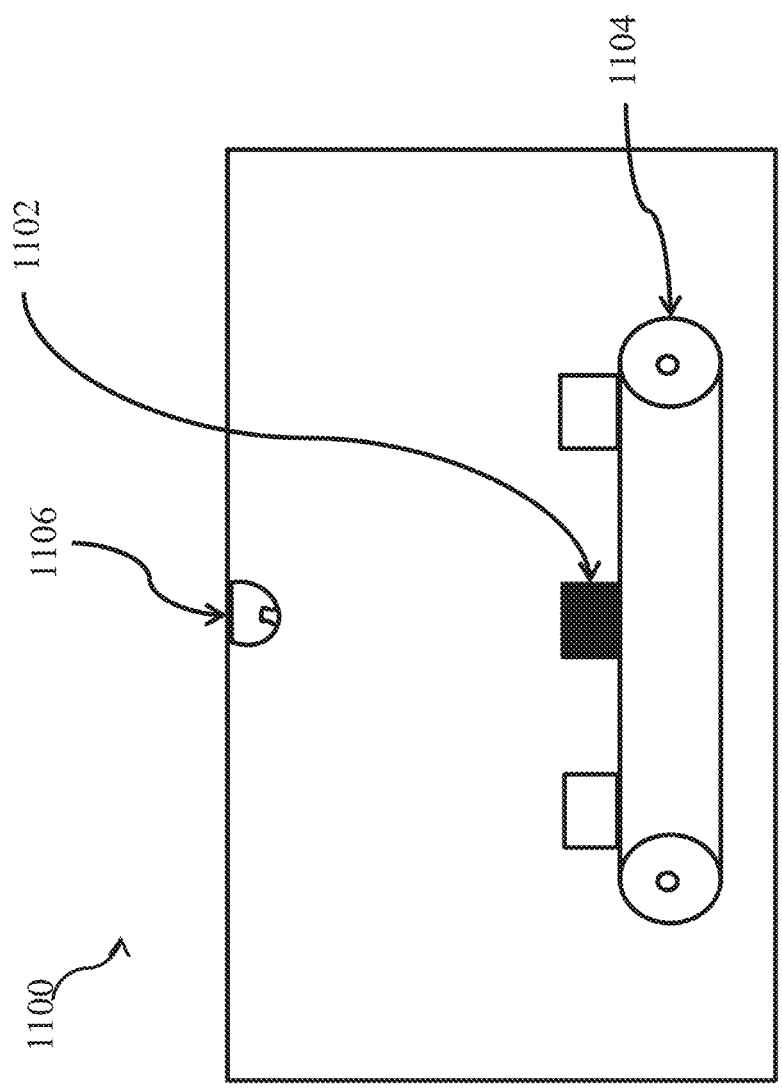

SYSTEM AND METHOD FOR MANIPULATING TWO-DIMENSIONAL (2D) IMAGES OF THREE-DIMENSIONAL (3D) OBJECTS

TECHNICAL FIELD

The present disclosure generally relates to image processing, and more specifically to a system and method for manipulating two-dimensional (2D) images of three-dimensional (3D) objects.

BACKGROUND

Nowadays, image manipulation of two-dimensional (2D) images of human faces is gaining popularity in a wide range of applications. These include varying illumination conditions to make an appealing portrait image, changing identity of a person to anonymize an image, exchanging hairstyles in a virtual try-out setting, etc. In face image manipulation, careful handling of details of a face image is crucial to achieve photorealism in a synthesized face image. However, the human visual system may be sensitive to very small artifacts in the synthesized face images. Typically, in order for a 2D image of an object to be photorealistic, should be equivalent to a 2D view of a realistic 3D object (e.g., a 3D face whose shape and reflectance properties are within the range of typical human experience). Thus, in order for a modified 2D face image to remain photorealistic, it should correspond to realistic variations in a corresponding 3D object or its environment, such as variations in the apparent shape, expression, and appearance attributes of a corresponding 3D face. State-of-the-art existing methods for photorealistic automated image manipulation of 2D face images are inherently 2D—that is, such methods modify one 2D face image to form another 2D face image, without explicitly determining a 3D face that corresponds to either image. This limits the ability of such 2D methods to synthesize large variations, such as pose changes (e.g., from frontal view to profile view) of the 2D images.

On the other hand, existing methods for image manipulation that are inherently 3D and are trained from 3D scans of human faces can accurately perform 3D manipulations, but they are limited in their ability to generate photorealistic 2D images of the resulting 3D synthesized faces. For instance, a 3D face model may be used for reconstructing a 3D face from a 2D image of a human face. The 3D model may be obtained from a training 3D dataset of the human face. The training 3D dataset may have limited variations in the attributes of the 2D images, which may result in limited expression and limited pose control over the faces. Furthermore, the 3D training dataset may not have sufficient detail or sufficiently accurate information about the faces in the 3D training dataset to render photorealistic 2D images. Such limitation may cause lack of realism in the reconstructed 2D face images. In some cases, high-quality 3D scans of the human face may be performed for increasing 3D data of the training 3D dataset. However, the high-quality 3D scans may consume excessive amounts of time and storage resources.

Accordingly, there is a need for a technical solution for reconstructing and manipulating 2D images with photorealism. More specifically, there is need for manipulating 2D images of 3D objects to achieve photorealism in an efficient and feasible manner.

SUMMARY

Accordingly, it is an objective of the present disclosure to provide a system for manipulating 2D images of 3D objects.

An image of a 3D object is a 2D representation that is affected by one or multiple physical properties of the 3D object. The one or multiple physical properties of the 3D object include a 3D shape of the 3D object, an albedo of the 3D shape, a pose of the 3D object, and lighting illuminating the 3D object. When there is change in a value of each of these physical properties, the 2D image representation of the object is affected. To that end, the 2D image representation of the object may be manipulated based on manipulation of each of the physical properties. Additionally or alternatively, prior to the manipulation, the 2D image may be masked by a mask image. The mask image may be automatically generated for the 2D image using a segmentation method such as a semantic segmentation network, landmark localization, or face parsing. The mask image segments regions, such as segmenting a background region from a foreground region corresponding to the 3D object in the 2D image by masking the background region from the foreground region. For instance, a human face in a 2D image may be segmented by masking background region in the 2D image using a corresponding face mask image of the human face, and may be further segmented into a hair region using a corresponding hair mask image of the hair. Such mask images may improve further processing of the 2D image representation of the 3D object.

Some embodiments are based on the realization that the one or multiple physical properties may be extracted from the 2D image representation of the 3D object. For example, some embodiments are based on the recognition that a neural network may be trained in one or a combination of a supervised manner and an unsupervised manner to extract the one or multiple physical properties of 3D objects from training 2D images of the 3D objects, and to reconstruct the training images back from the extracted one or multiple physical properties of the objects. The one or multiple physical properties may include a 3D shape of the 3D input object, an albedo of the 3D shape of the 3D input object, a pose of the 3D input object, and lighting illuminating the 3D input object. In some example embodiments, the neural network is pretrained in one or a combination of a supervised manner and an unsupervised manner based on a dataset comprising synthetically generated human face images. Such pretraining process may enable the neural network to capture one or more salient facial features from the synthetically generated human face images.

Some embodiments are based on the realization that manipulation of these extracted physical properties of 3D objects prior to reconstruction of the image may be used for a realistic image manipulation, by manipulating the properties of the 3D object and then rendering the manipulated 3D object as a 2D image, as contrasted with image manipulation directly in the 2D domain of the image. Some embodiments are based on another realization that the neural network may include multiple and/or different subnetworks. In some example embodiments, the multiple subnetworks extract different physical properties of 3D objects from the 2D images. The extraction of the different physical properties by the subnetworks allows disentangling the different physical properties in an independent or separate manner. The independent disentanglement of each of the physical properties enable in representing different variations in one or more corresponding physical properties, which in turn contribute to achieving realism in reconstructing a 2D output image from a 2D input image of a 3D object. To that end, the disentangled physical properties may be rendered into a 2D image.

Some embodiments are based on the realization that due to limitations in factors such as the rendering process, the representation of one or multiple physical properties, or the level and type of variations present in training data, the resulting rendered 2D image may not have a desired level of photorealism. Some embodiments are based on further realization that photorealism of the rendered 2D image may be enhanced by 2D refinement of the rendered 2D image, which is performed in some embodiments using a 2D refiner network that may be trained using an adversarial approach such as one used in training a generative adversarial network (GAN).

In some example embodiments, each of the one or multiple physical properties is disentangled by the trained neural network from pixels of the 2D input image using the multiple subnetworks. Each of the multiple subnetworks disentangles one or more of the one or multiple physical properties of the 3D object. The disentangled one or multiple physical properties produced by the multiple subnetworks is combined into the 2D output image using a differentiable renderer. For instance, the differentiable renderer renders a reconstructed 2D image, such as the 2D output image using the disentangled physical properties of lighting and pose of the 3D object. Such disentanglement allows designing different specialized subnetwork architectures that may adapt for different physical properties.

Some embodiments are based on the realization that using a differentiable renderer, rather than a more classical computer graphics renderer, enables a combination neural network that includes one or more of the subnetworks and the differentiable renderer to be trained end-to-end, so that errors in rendered images can be propagated back through the combination neural network to train one or more of the subnetworks.

In one embodiment, an albedo subnetwork may be trained to extract the albedo of the 3D object from pixels of the 2D input image. To that end, the albedo subnetwork may include a style-based generative adversarial network (GAN) architecture, and the network may be trained adversarially using a GAN framework. The style-based GAN may be trained using a set of photographic images of objects from a predetermined class. In some embodiments, the 3D objects may be selected from the predetermined class of human faces.

The style-based GAN architecture may be advantageous for generating realistic 2D images.

Some embodiments are based on the realization that style-based GANs, such as the StyleGAN and StyleGAN2 neural network architectures, typically generate photorealistic 2D images of objects from a predetermined class (e.g., faces) after being trained on a large dataset of 2D photographic images of objects from the predetermined class (e.g., a large database of face images) by allowing the style-based GAN's input to modulate intermediate layers of the style-based GAN generator neural network. Typically, the style-based GANs are used to directly generate 2D images that are trained, using adversarial training with a discriminator network, to be indistinguishable from photographic images from the training dataset. However, in order to generate 3D object models by the style-based GANs using only 2D photorealistic image data, output space of the style-based architecture may be part of the 3D model rather than the 2D image space of the real-world dataset. Some embodiments are based on the further realization that style-based GANs may be used to generate an albedo of a 3D object, e.g., a 2D albedo map. Such 2D albedo map may be applied to a 3D shape of the 3D object that may be further inputted into a renderer to generate a synthetic 2D output image of the 3D object. However, training a style-based GAN to generate albedo maps may require high-quality albedo maps to train the style-based GAN by applying a discriminator to its output space. Such high-quality albedo maps may be difficult or costly to obtain and may require specialized equipment.

Some embodiments are based on the additional realization that to generate photorealistic synthetic 2D output images without high-quality albedo maps, a discriminator network used for adversarial training may be applied after using a differentiable renderer to render the 3D object model into a 2D synthetic image. The differentiable renderer rendering the 3D object model into the 2D synthetic image before application of a discriminator may alleviate the need to apply a discriminator directly to the 2D albedo map that is output by the style-based GAN. In this way, the style based GAN architecture may be used to generate the albedo maps for 3D objects, while the discriminator network is used on the output at the end of the rendering process, in a space of 2D images. It may be possible to obtain a large amount of real-world training data (e.g., photographic images of faces) in the 2D image space.

Some embodiments are based on the additional realization that to generate photorealistic synthetic 2D output images without high-quality albedo maps, a discriminator network may be used for adversarial training of the style-based GAN. The discriminator network may be applied after using a differentiable renderer to render the 3D object model into a 2D synthetic image. The differentiable renderer rendering the 3D object model into the 2D synthetic image prevents directly applying the 2D albedo map to the style-based GAN. In this way, the stytle-based GAN architecture may be used to the generated albedo maps for 3D objects, while the discriminator network is used for the output at the end of the rendering process, in a space of 2D images. The 2D image space may be used for obtaining a large amount of real-world training data (e.g., photographic images of faces.)

Additionally or alternatively, some embodiments are based on the realization that the neural network may be trained in an unsupervised manner. The unsupervised neural network may extract the different physical properties of 3D objects into a latent space. The latent space may be used for reconstructing a physical space for the corresponding physical property. For example, an albedo subnetwork, as well as a 3D shape subnetwork, may have GAN architectures that encode pixels of the 2D image into corresponding latent spaces of each of an albedo of the object and a 3D shape of the object. These latent spaces may be used for generating physical spaces for the albedo and the 3D shape of the object. The latent space and the physical space enable a dual representation of the object. Such dual representation allows manipulating the physical property in either or both of the latent and physical space for achieving a photorealistic 2D image. In contrast, in some embodiments, the lighting and the pose subnetworks are encoded from the pixels of the 2D image directing into the corresponding physical spaces. The unsupervised training of the neural network for the extraction of the different physical properties into the latent space may preclude the need for real 3D data, which may improve overall performance and storage efficiency of the image processing system.

Additionally or alternatively, the image processing system may be used for generating a plurality of realistic synthetic images from the 2D images of the 3D objects. The plurality of realistic synthetic images includes variations in the one or multiple physical properties of the poses, expressions, and lighting illumination of the 3D objects. The plurality of realistic synthetic images may be used in different applications. The different applications may include an application for generating a cartoon or animated version of a user, an application for trying out different hairstyle looks on the user, a camera-enabled robotic system application, a face recovery application, and/or the like. In some example embodiments, the plurality of realistic synthetic images may be used as training data sample images for a different system (e.g., the robotic system, the face recovery application) for generating realistic training images in an efficient manner, while alleviating a need to collect the sample images using a camera associated with the corresponding system. For instance, an existing dataset for training the different system may include images of faces that do not have the same variations in the one or multiple physical properties such as pose, expression, and lighting as images that the different system processes when it is deployed. In such cases, the plurality of realistic synthetic images may be used to augment or replace the existing training dataset with images that include more examples for the different system.

Additionally or alternatively, the image processing system may be used to generate an anonymized version of an input image. The anonymized version may be generated using anonymization techniques, for example, replacing a face in the input image by a realistic synthetic image generated by manipulating some of the one or multiple physical properties of the input image, such as one or both of shape and albedo, while preserving others of the one or multiple physical properties such as pose and lighting. This may be used, for example, in applications in which images such as face images are to be made public but in which the users of the system do not have permission to share photographs or videos of one or more persons in the input image.

Additionally or alternatively, the image processing system may be used to generate an anonymized version of an input image. The anonymized version may be generated using anonymization techniques, for example, similarity-based metric. This may be used, for example, in applications in which images such as face images are to be made public but in which the users of the system do not have permission to share photographs or videos of one or more persons in the input image.

Accordingly, one embodiment discloses an image processing system for manipulating two-dimensional (2D) images of three-dimensional (3D) objects of a predetermined class. The image processing system comprises an input interface, a memory, a processor and an output interface. The input interface is configured to receive a 2D input image of a 3D input object of the predetermined class, and one or multiple manipulation instructions for manipulating one or multiple physical properties of the 3D input object. The one or multiple physical properties include a 3D shape of the 3D input object, an albedo of the 3D shape of the 3D input object, a pose of the 3D input object, and lighting illuminating the 3D input object. The memory is configured to store a neural network. The neural network is trained to reconstruct the 2D input image by disentangling the one or multiple physical properties of the 3D input object from pixels of the 2D input image using multiple subnetworks. The disentangled one or multiple physical properties produced by the multiple subnetworks are combined into a 2D output image using a differentiable renderer. There is one subnetwork for each subset of one or more of the one or multiple physical properties of the 3D input object, and each subnetwork of the multiple subnetworks is trained to extract a corresponding physical property from the pixels of the 2D input image into a one or a combination of latent space and physical space of the corresponding physical property. An albedo subnetwork is trained to extract the albedo of the 3D input object from the pixels of the 2D input image has a style-based generative adversarial network (GAN) architecture trained using a set of photographic images of objects from the predetermined class. The processor is configured to submit the 2D input image received from the input interface to the neural network and manipulating the latent space, the physical space, or both, of the one or multiple physical properties of the 3D input object according to the one or multiple manipulation instructions. The manipulation is performed on the disentangled one or multiple physical properties produced by the multiple subnetworks to modify the 3D input object before the differentiable renderer reconstructs the 2D output image. The output interface is configured to output the 2D output image.

Accordingly, another embodiment discloses a method for manipulating two-dimensional (2D) images of three-dimensional (3D) objects of a predetermined class. The method includes receiving a 2D input image of a 3D input object of the predetermined class, and one or multiple manipulation instructions for manipulating one or multiple physical properties of the 3D input object. The one or multiple physical properties include a 3D shape of the 3D input object, an albedo of the 3D input object, a pose of the 3D input object, and lighting illuminating the 3D input object. The method includes submitting the 2D input image to a neural network and manipulating the latent space, the physical space, or both, of the one or multiple physical properties of the 3D input object according to the one or multiple manipulation instructions, wherein the manipulation is performed on the disentangled one or multiple physical properties produced by the multiple subnetworks to modify the 3D input object before the differentiable renderer reconstructs the 2D output image. The neural network is trained to reconstruct the 2D input image by disentangling the physical properties of the 3D input object from pixels of the 2D input image using multiple subnetworks, and combine the disentangled physical properties produced by the multiple subnetworks into a 2D output image using a differentiable renderer. There is one subnetwork for each subset of one or more of the physical properties of the 3D input object. Each subnetwork of the multiple subnetworks is trained to extract a corresponding physical property from the pixels of the 2D input image into a one or a combination of latent space and physical space of the corresponding physical property. An albedo subnetwork trained to extract the albedo of the 3D input object from the pixels of the 2D input image has a style-based generative adversarial network (GAN) architecture trained using a set of photographic images of objects from the predetermined class. The method further includes outputting the 2D output image.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 11 illustrates a use case scenario for manipulating 2D images of 3D objects of a predetermined class, according to yet another example embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Overview

The proposed image processing system enables reconstruction of a 2D output image from a 2D input image of a 3D object of a predetermined class, such as a human face. It is an objective of the image processing system to manipulate the 2D input image for the reconstructing of the 2D output image. The 2D input image is manipulated by disentangling one or multiple physical properties of the 2D input image, such as a 3D shape of the 3D object, an albedo of the 3D object, a pose of the 3D object, and lighting illuminating the 3D object, which is further explained in FIG. 1.

Figure 1:
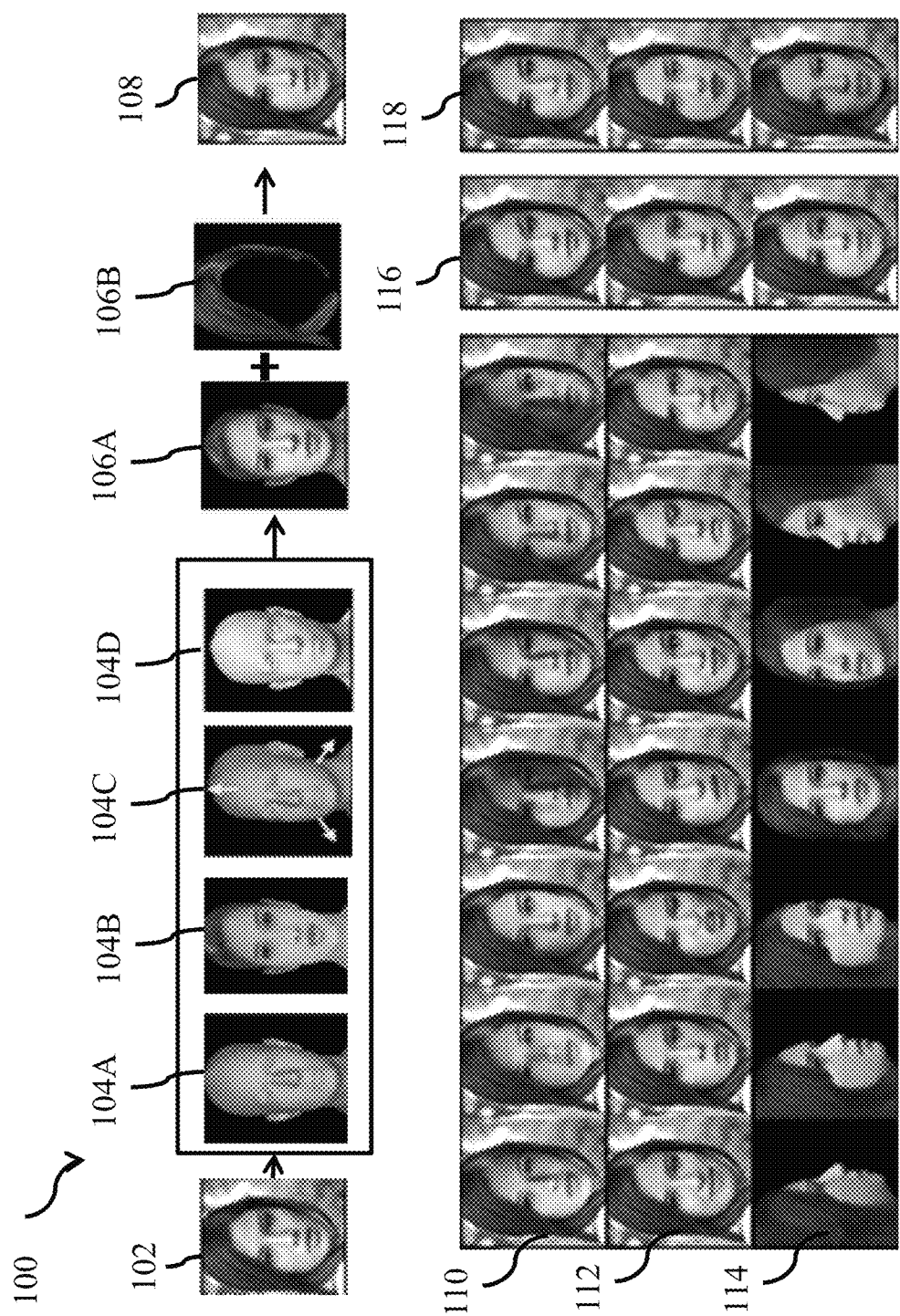
FIG. 1 shows an exemplary representation depicting an image manipulation of an image of a 3D object, according to some embodiments of the present disclosure.

FIG. 1 shows an exemplary representation 100 depicting an image manipulation of an image 102 of a 3D object, according to some embodiments of the present disclosure. The image 102 is a 2D representation of the 3D object, such as a human face. The image 102 possesses one or multiple physical properties that may be extracted from the 2D representation of the human face. In some example embodiments, the one or multiple physical properties may be extracted from pixel values of the 2D image 102. The extracted one or multiple physical properties may be explicitly represented as: an estimated 3D shape 104A of the 3D input object; an estimated albedo 104B of the 3D input object, an estimated pose 104C of the 3D input object, and an estimated lighting 104D illuminating the 3D input object. The explicit representation of each of the one or multiple physical properties, collectively referred to hereinafter as one or multiple physical properties 104A-104D, enable manipulation of each of the one or multiple physical properties 104A-104D in an independent manner. The manipulation herein corresponds to change in values (e.g., pose angles or lighting parameters) of each of the corresponding one or multiple physical properties 104A-104D. When there is change in values of the one or multiple physical properties, the 2D representation of the image 102 is manipulated. In some example embodiments, such independent manipulation of the one or multiple physical properties 104A-104D may be used for generating a plurality of realistic synthetic images from the 2D images of the 3D objects. The plurality of realistic synthetic images may correspond to variations in the one or multiple physical properties 104A-104D of the 3D objects.

The one or multiple physical properties 104A-14D are combined to generate a 3D model of the object, which may be rendered to produce a 2D synthetic image 106A that resembles the input image 102. Manipulation of one or more of the one or multiple physical properties 104A-104D corresponds to changes in the 3D object model, which cause corresponding manipulations in the 2D synthetic image 106A. Such manipulation prior to rendering the 3D model as a reconstructed synthetic 2D image 106A enables an image manipulation of the image 102 in a realistic manner. In some embodiments, the reconstructed synthetic 2D face model 106A is combined with a hair model 106B to generate a final output image, such as an output image 108, which is a photorealistic synthetic 2D image corresponding to a manipulated version of the input image 102.

Further, the changes in each of the one or multiple physical properties 104A-104D generate different manipulations, such as a lighting variation 110, a facial expression variation 112, a pose variation 114, a shape variation 116, and a texture variation 118 of the image 102. The different manipulations of the physical properties 104A-104D may be used to synthesizing photorealistic 2D images that correspond to variations in properties such as pose, facial expression, and lighting conditions of the input image 102.

Figure 2:
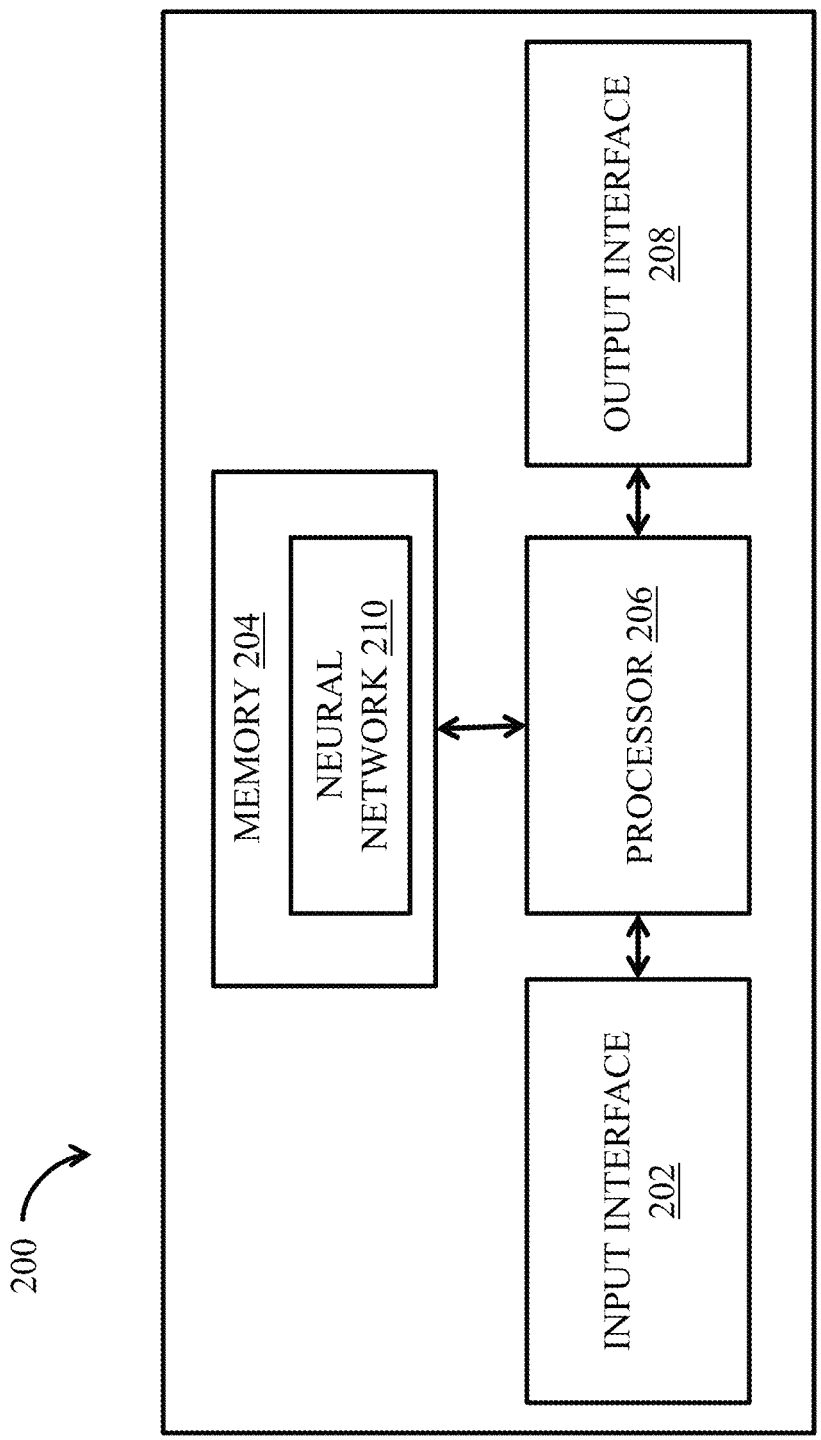
FIG. 2 shows a block diagram of a system for manipulating two-dimensional (2D) images of three-dimensional (3D) objects of a predetermined class, according to one example embodiment of the present disclosure.

Such image manipulation of the 2D representation of the image 102 through the disentanglement of each of the one or multiple physical properties 104A-104D is performed by a system, which is described further with reference to FIG. 2.

FIG. 2 shows a block diagram of a system 200 for manipulating 2D images of 3D objects of a predetermined class, according to one example embodiment of the present disclosure. The system 200 corresponds to an image processing system that includes an input interface 202, a memory 204, a processor 206 and an output interface 208. The input interface 202 is configured to receive a 2D input image, such as the image 102 of a 3D input object, i.e., the human face. The input interface 202 is also configured to receive one or multiple manipulation instructions for manipulating one or multiple physical properties, such as the one or multiple physical properties 104A-104D of the 3D input object that include a 3D shape of the 3D input object (e.g., the shape 104A), an albedo of the 3D input object (e.g., the albedo 104B), a pose of the 3D input object (e.g., the pose 104C), and a lighting property illuminating the 3D input object (e.g., the lighting 104D).

The memory 204 is configured to store a neural network 210. The neural network 210 is trained to reconstruct the image 102 by disentangling the one or multiple physical properties 104A-104D. The one or multiple physical properties 104A-104D are disentangled from pixels of the image 102. In some embodiments, multiple subnetworks are used for disentangling the one or multiple physical properties 104A-104D from the pixels. There is one subnetwork for each of one more subsets of the one or multiple physical properties 104A-104D of the 3D object. Each subnetwork of the one or multiple subnetworks is trained to extract a corresponding physical property from pixels of the image 102 into a one or a combination of latent space and physical space of the corresponding physical property. For instance, an albedo subnetwork is trained to extract the albedo 104B of the 3D shape 104A of the 3D input object from the pixels of the image 102. In some embodiments, the albedo subnetwork may have a style-based generative adversarial network (GAN) architecture. In some example embodiments, the style-based GAN may be trained using a set of photographic images of objects from the predetermined class.

Further, each of the individual disentangled physical properties is combined into a 2D output image. In some embodiments, the individual disentangled physical properties are combined using a differentiable renderer. The differentiable renderer renders the 2D output image of the image 102 using physical spaces of the one or more physical properties 104A-104D.

The processor 206 is configured to submit the image 102 received from the input interface 202 to the neural network 210, while manipulating the latent space, the physical space, or both, of the one or multiple physical properties of the 3D input object according to the one or multiple manipulation instructions. The processor 206 is configured to manipulate the disentangled physical properties by the multiple subnetworks to modify the 3D input object so that the differentiable renderer reconstructs the 2D output image. The 2D output image is outputted via the output interface 208.

Figure 3:
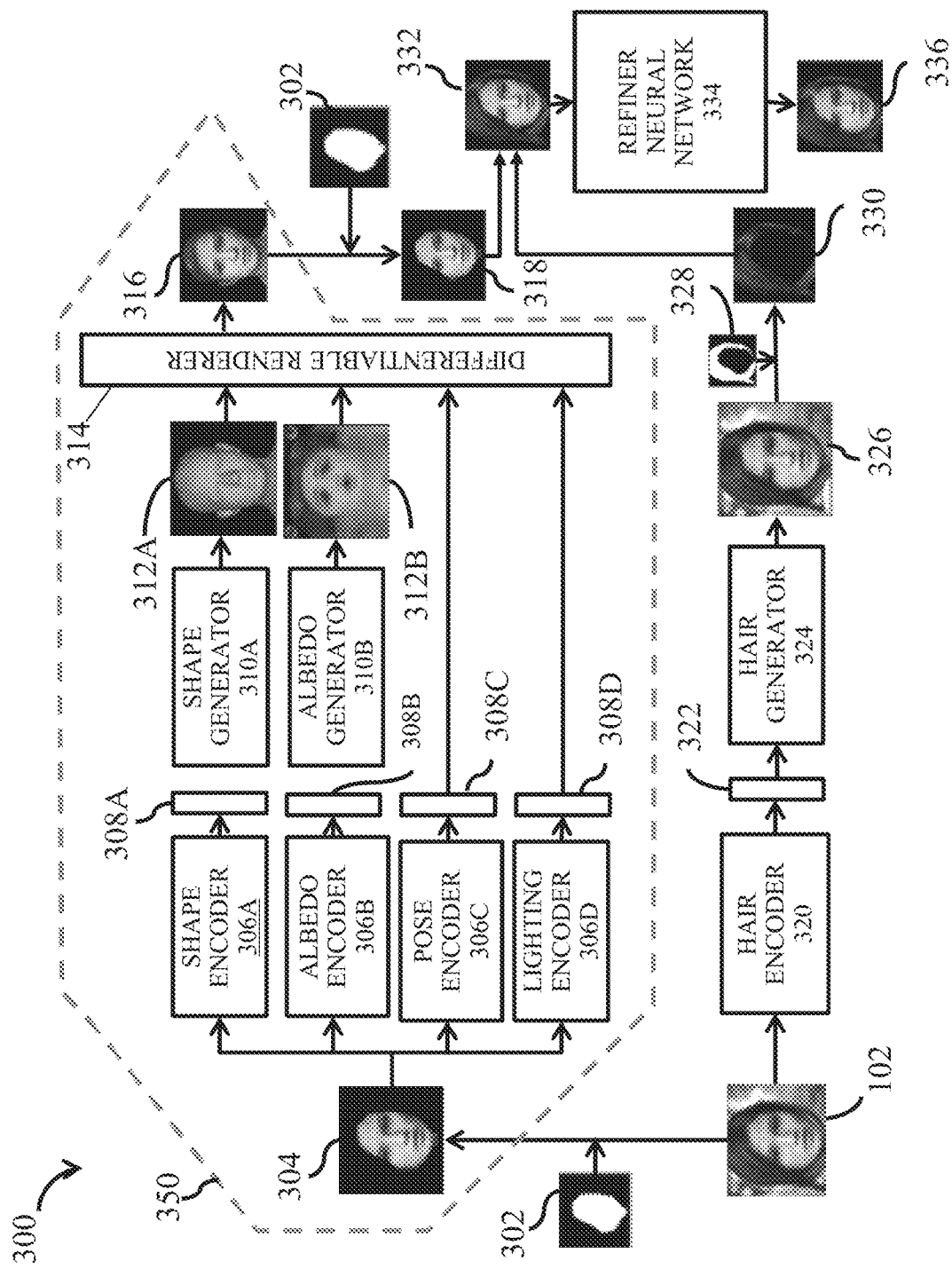
FIG. 3 shows a framework of a neural network for manipulating 2D images of 3D objects of a predetermined class, according to one example embodiment of the present disclosure.

The disentangling of each of the one or multiple physical properties by the corresponding subnetwork of the neural network 210 is described further with reference to FIG. 3.

FIG. 3 shows a framework 300 of the neural network 210 for manipulating 2D images of 3D objects of a predetermined class, according to one example embodiment of the present disclosure. When the image 102 is received, the processor 206 generates a mask image 302 for the image 102. In some example embodiments, the processor 206 may estimate the mask image 206 using a semantic segmentation network. The semantic segmentation network may generate the mask image 302 that includes some pixels that represent background (e.g., pixels with value zero) and remaining pixels that represent foreground (e.g., pixels with non-zero values such as the value 1.0). The image 102 is masked with the mask image 302 such that the values of pixels that represent the 3D object in the image 102 are retained in the masked image 304, while the values of pixels that represent the background and (in the case of faces) hair in the image 102 are masked by the pixel values that are zero. The masking of the segmented background (and hair) pixel values yields a masked image 304 that contains the pixel values that represent the object of the predetermined class (e.g., face) in the image 102. This masked image 304 is submitted to the neural network 210.

The neural network 210 includes multiple subnetworks disentangling the one or multiple physical properties 104A-104D of the image 102. In some example embodiments, the multiple subnetworks correspond to encoder architectures that includes a shape encoder 306A, an albedo encoder 306B, a pose encoder 306C, and a lighting encoder 306D (referred to hereinafter as encoders 306A-306D), as shown in FIG. 3. Each of the multiple subnetworks, i.e., each of the encoders 306A-306D, processes the image 102 to extract each of the corresponding one or multiple physical properties 104A-104D from pixels of the masked image 304. For instance, the encoder 306A extracts the shape 104A, the encoder 306B extracts the albedo 104B, the encoder 306C extracts the pose 104C and the encoder 306D extracts the lighting 104D.

The one or multiple physical properties 104A-104D that are extracted from the image 102 may be represented in one or a combination of latent space and physical space of the corresponding physical property. For instance, the shape encoder 306A extracts a shape code 308A in a shape latent space, and the albedo encoder 306B extracts an albedo code 308B in an albedo latent space. In contrast, the pose encoder 306C extracts a pose representation 308C in a pose physical space, and the encoder 306D extracts a lighting representation 308D in a lighting physical space. Each of the shape code 308A and the albedo code 308B represents a compressed state of the corresponding physical property, i.e., the shape 104A and the albedo 104B.

Further, the shape code 308A and the albedo code 308B are respectively given as input to a corresponding shape generator 310A and albedo generator 310B, to respectively generate a shape representation 312A in shape physical space and an albedo representation 312B in an albedo physical space. In some example embodiments, the shape generator 310A corresponds to a convolutional generator that generates a 3D shape 312A of the image 304 from the shape latent space 308A. For instance, the generated 3D shape 312A may be composed of 3 channels in a texture mapping space, such as a UV-space that represents 3D coordinates of vertices of the 3D shape 312A. In some example embodiments, the albedo representation 312B is represented as an albedo map, which can be used to determine an albedo at specific or arbitrary locations on the 3D shape 312A. For example, the albedo representation 312B may correspond to a Red-Green-Blue (RGB) albedo map in the UV space. In some embodiments, the albedo representation 312B includes one or more channels for specular reflection. For example, the albedo representation 312B may correspond to a Red-Green-Blue-Specular albedo map with 4 channels (red diffuse, green diffuse, blue diffuse, and specular) in the UV space. Different variations in the albedo code 308B in the albedo latent space may correspond to different variations of the albedo map of the albedo representation 312B in the albedo physical space for achieving a photorealistic image in a final output image of the image manipulation. To that end, in some embodiments, the albedo generator 310B corresponds to a style-based generative adversarial network (GAN).

In some example embodiments, the lighting physical space 308C may be represented using a spherical harmonic parameterization. The spherical harmonic parameterization enables recovery of a physical property corresponding to lighting illuminating a 3D object (such as the lighting 104D) of the image 102 that can approximate arbitrary unknown lighting conditions. In some example embodiments, the pose latent space 308D may correspond to a 6-degree-of-freedom (6-DOF) pose vector that includes 3 parameters for 3D rotation via an axis-angle representation and 3 parameters for a 3D translation.

The processes starting from processing the image 102, yielding the masked image 304, extracting each of the corresponding one or multiple physical properties 104A-104D from pixels by the encoders 306A-306D, generating shape representation 312A and albedo representation 312B, to outputting the rendered image 316 corresponds to a face reconstruction pipeline 350, as shown in FIG. 3. In some embodiments, the face reconstruction pipeline 350 may not include using a mask image 302.

The generated 3D shape 312A, the albedo map 312B, the pose physical space 308A and the lighting physical space 308D are given as input to a differentiable renderer 314. The differentiable renderer 314 produces a rendered image 316 of the 3D face model from the 3D shape 312A and the albedo representation 312B using the physical space pose representation 308C and the physical space lighting representation 308D.

The processes starting from processing the image 102, yielding the masked image 304, extracting each of the corresponding one or multiple physical properties 104A-104D from pixels by the encoders 306A-306D, generating shape representation 312A and albedo representation 312B, to outputting the rendered image 316 corresponds to a face reconstruction pipeline 350, as shown in FIG. 3.

Further, the rendered image 316 of the 3D face model is masked using the mask image 302 to generate a reconstructed masked rendered face image 318. The reconstructed masked rendered face image 318 is combined with a reconstructed 2D masked hair image 330. In parallel, the masked hair image 330 is reconstructed from the image 102 using a hair-manipulation algorithm. In some embodiments, the hair-manipulation algorithm corresponds to an encoder-generator architecture that includes a hair encoder 320 and a hair generator 324. The encoder 320 extracts hair features 322 corresponding to hair from the image 102. The extracted hair features 322 are provided to the hair generator 324 as input. The hair generator 324 generates a hair image in 2D, such as hair image 326. The hair image 326 is masked with a hair mask 328 to generate the masked hair image 330.

The combination of the masked rendered face image 318 and the masked hair image 330 generate a combined synthetic face image 332 from the face in the image 102. In some embodiments, the reconstructed combined synthetic face image 332 is inputted to a refiner network 334 to generate a photorealistic refined synthetic face image 336 as output of the image manipulation of the image 102.

For a given set of N portrait images ($x^i$) along with face masks ($M_f^i$) and hair masks ($M_h^i$) denoted as $\{(x^i, M_f^i, M_h^i)\}_{i=1}^N$, the following optimization problem is solved:

$$\underset{\{E_\alpha, E_\beta, E_\gamma, E_\theta, G_\alpha, G_\beta, R\}}{\arg\min} \sum_{i=1}^N \left\| x^i \odot (M_f^i + M_h^i) - \hat{x}^i \right\|_1 \quad (1)$$

where each final image (e.g., photorealistic refined synthetic face image 336) is denoted as $\hat{x} = R(\hat{x}_f \odot M_f + \hat{x}_h \odot M_h)$ with $\hat{x}_f = \Phi(G_\alpha(E_\alpha(x')), G_\beta(E_\beta(x')), E_\gamma(x'), E_\theta(x'))$ representing a reconstructed image, such as the rendered face image 316, and $\hat{x}_h = G_h(E_h(x))$ represents the reconstructed hair image, such as the hair image 326. The term x denotes an input image, such as the image 102, $M_f$ denotes a face mask (e.g., the mask image 302), and $x' := x \odot M_f$ denotes the masked image 304. The term $M_h$ denotes a hair mask, such as the hair mask image 328, and thus the reconstructed 2D masked hair image 330 may be expressed as $\hat{x}_h \odot M_h$. The term $E_\alpha$ denotes the shape encoder 306A that extracts the shape code 308A (denoted by $\alpha$), $E_\beta$ denotes the albedo encoder 306B that extracts the albedo code 308B (denoted by $\beta$), $E_\theta$ denotes the pose encoder 306C that extracts the pose representation 308C (denoted by $\hat{\theta}$) and $E_\gamma$ denotes the lighting encoder 306D that extracts the lighting representation 308D (denoted by $\hat{\gamma}$). Further, the term $G_\alpha$ denotes the shape generator 310A, which generates the 3D shape representation 312A (denoted by $\hat{S}$) and $G_\beta$ denotes the albedo generator 310B, which generates the albedo representation 310B (denoted by $\hat{A}$). The differentiable renderer 314, denoted $\phi$, renders the rendered image 316 of the 3D face model $\{\hat{S}, \hat{A}\}$ using the physical space pose representation 308C ($\hat{\theta}$) and the physical space lighting representation 308D ($\hat{\gamma}$) to output the rendered face image denoted as $\hat{x}_f$) $\hat{x}_f = \Phi(\hat{S}, \hat{A}, \hat{\gamma}, \hat{\theta})$.

In some example embodiments, the albedo generator 310B corresponds to a style-based Generative Adversarial Network (style-based GAN) generator, for example a (Style-GAN or StyleGAN2 neural network architecture). To that end, the system 300 may be trained adversarially with a GAN framework using a set of photographic images of human faces to generate photorealistic output images 336 that exhibit different variations of the human face in the image 102.

The style-based GAN generator may be used to generate realistic images from a predetermined class by allowing the input of the style-based GAN (e.g., the albedo code 308B) to modulate intermediate layers of the generator neural network (e.g., albedo generator 310B). When data from albedo maps are available (e.g., during pretraining using synthetic data), an adversarial discriminator network may be applied directly to the output (e.g., the albedo map 312B) of the style-based GAN (e.g., the albedo generator 310B). In some embodiments, an adversarial discriminator network is applied to an output or intermediate product of the framework 300 that is downstream of or derived from the output of the style-based GAN. For example, an adversarial discriminator that is used to help train the style-based GAN may be applied to an output or intermediate product that is in the space of 2D images of 3D objects (e.g., 2D images of faces), such as the refined synthetic face image 336.

In some embodiments, one or more discriminator networks may be used to train the style-based GAN architecture of the albedo generator 310B as well as other generators in the framework 300, such as one or more of the shape generator 310A and the hair generator 324. The discriminator networks may be applied at one or multiple stages of the framework 300. In some embodiments, for example, a discriminator network is applied to outputs or intermediate images of the framework 300 after the differentiable renderer, such as one or more of the rendered image 316, the masked rendered face image 318, the combined synthetic face image 332, and the refined synthetic face image 336.

Figure 4:
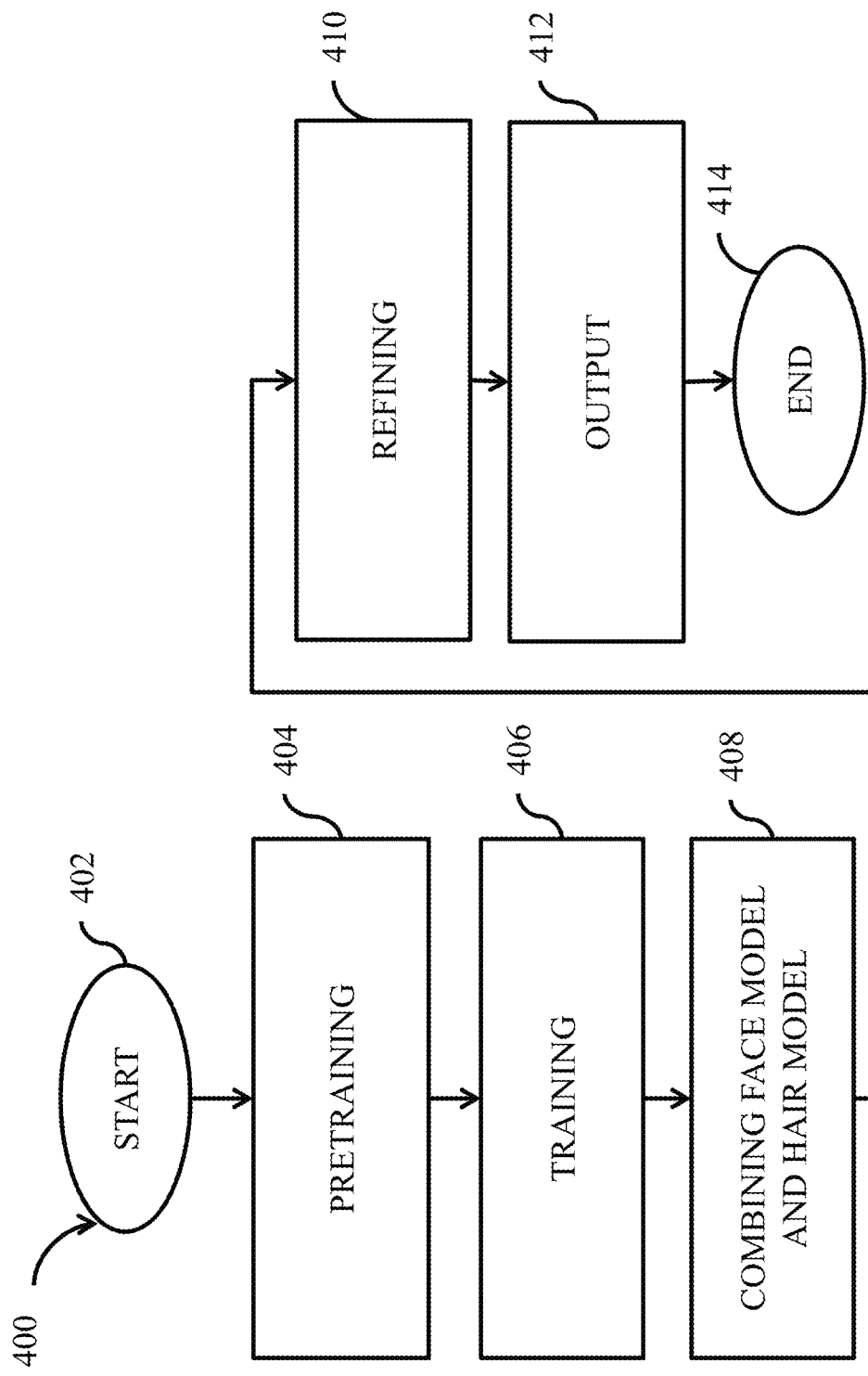
FIG. 4 shows a flowchart illustrating a process for manipulating 2D images of 3D objects of a predetermined class, according to one example embodiment of the present disclosure.

In some embodiments, part or the entire neural network 210, for example, the face reconstruction pipeline 350, may be pretrained, which is further described in FIG. 4.

FIG. 4 shows a flowchart illustrating a process 400 for manipulating 2D images of 3D objects of a predetermined class, according to one example embodiment of the present disclosure. The process 400 starts at step 402. The steps of the process 400 may be executed by the processor 206.

Step 404 corresponds to pretraining the face reconstruction pipeline 350 of the framework 300 of FIG. 3. The face reconstruction pipeline 350 is performed by encoders and generators, such as the encoders 306A-306D and the shape generator 310A and the albedo generator 310B, as well as the differentiable renderer 314. To that end, at step 404, the encoders 306A-306D and the generators 310A and 310B of the neural network 210, are pretrained using a pretraining dataset. For instance, the face reconstruction pipeline 350 is trained to input images from the pretraining dataset as the input image 304 and output rendered images, such as the rendered image 316, as a reconstruction of the input image 304. In some embodiments, the pretraining input images 304 and the pretraining output images 316 are not masked. The face reconstruction pipeline 350 may be pretrained using a dataset of synthetically generated face images, such as ones generated by a linear 3D morphable model (3DMM). In such pretraining, the face reconstruction pipeline 350 learns to capture features of faces using the synthetically generated face images. For instance, 80,000 2D face images for pretraining may each be rendered by randomly sampling a 3D head model from a 3DMM, such as the Faces Learned with an Articulated Model and Expressions (FLAME) model, and rendered the sampled model into a 2D image. Before each sampled 3D model is rendered to produce a training set image, it may be translated in 3D so that the resulting 2D face image in the training set correspond to the same 2D alignment as the faces in a dataset of real face images. The dataset of real face images is also used during training step 406. Further, ground truth values for disentangled one or multiple physical properties are used to generate each of the images in the pretraining set, such as ground truth values corresponding to the one or multiple physical properties 104A-104D. Such ground truth values may be used to guide the pretraining process by imposing reconstruction losses between the ground truth and estimated values of the physical properties, including the shape representation 312A ($L_{shape}^{syn}$) 312A, the albedo representation 312B ($L_{albedo}^{syn}$), the lighting representation in the lighting physical space 308D ($L_{lighting}^{syn}$), and the pose representation in the pose physical space 308C ($L_{pose}^{syn}$), which are represented in the following equations.

$$L_{image}^{syn} = \|P_x - \hat{x}_f P_2\|_2^2$$

$$L_{albedo}^{syn} = \|PA - \hat{A} P_2\|_2^2$$

$$L_{shape}^{syn} = \|P w_s^T (S - \hat{S}) P_2\|_2^2$$

$$L_{pose}^{syn} = \|P\theta - \hat{\theta} P_2\|_2^2.$$

$$L_{lighting}^{syn} = \|P\gamma - \hat{\gamma} P_2\|_2^2$$

$$L_{reg}^{syn} = \lambda_\alpha P\alpha P_2^2 + \lambda_\beta P\beta P_2^2$$

$$L_{image}^{syn} = \|x - \hat{x}_f\|_2^2 \tag{2}$$

$$L_{albedo}^{syn} = \|A - \hat{A}\|_2^2 \tag{3}$$

$$L_{shape}^{syn} = \|w_s^T (S - \hat{S})\|_2^2 \tag{4}$$

$$L_{pose}^{syn} = \|\theta - \hat{\theta}\|_2^2 \tag{5}$$

$$L_{lighting}^{syn} = \|\gamma - \hat{\gamma}\|_2^2 \tag{6}$$

$$L_{reg}^{syn} = \lambda_\alpha \|\alpha\|_2^2 + \lambda_\beta \|\beta\|_2^2 \tag{7}$$

The loss function for pretraining 404 includes: reconstruction losses for the reconstructed face image ($L_{image}^{syn}$, represented by equation (2)); reconstruction losses for the one or multiple physical properties including the shape representation 312A ($L_{shape}^{syn}$ represented by equation (4)), the albedo representation 312B ($L_{albedo}^{syn}$, represented by equation (3)), the lighting representation in lighting physical space 308D ($L_{lighting}^{syn}$, represented by equation (6)), and the pose representation in the pose physical space 308C ($L_{pose}^{syn}$, represented by equation (5)) a regularization for the shape code 308A and the albedo code 308B ($L_{reg}^{syn}$, represented by equation (7)); and a non-saturating logistic GAN loss to improve the photorealism. The shape reconstruction loss in equation (4) may involve assigning weights ($w_s$) to the locations of vertices in regions surrounding salient facial features, such as eyes, eyebrows, mouth, and the like of the image 102.

During training 406, the neural network 210 is trained on real 2D images, such as the image 102, to generalize the model that was pretrained at step 404 on synthetic face images to work on real face images. In some example embodiments, the neural network 210 may be trained using dataset of face photographs and images. In some cases, the face photographs and images may include faces with accessories, such as glasses. In such case, the images with accessories may be eliminated from the dataset. A face mask image 302 ($M_f$) is obtained for each image in the dataset automatically using a semantic segmentation network. Additionally or alternatively, the face mask image 302 may be obtained using a different method, such as face parsing, facial landmark localization, or manual human annotation. The masked 2D face images 304 are inputted to the neural network 210. In some embodiments, during the training process 406, ground truth values of the one or multiple physical properties 104A-104D for the real face images is not known, and no reconstruction loss is applied to the one or multiple physical properties 104A-104D.

The pixelwise reconstruction loss between the masked input face image 304 and the masked rendered face image 318, is represented by equation (8), $$L_{image}^{real} = \|x \odot M_f - \hat{x} \odot M_f\|_2^2 \tag{8}$$

In addition, we may impose an identity loss between the input image 102 and a reconstructed face image $\hat{x} := x \odot (1 - M_f) + \hat{x} \odot M_f$, which combines the masked rendered face image 318 with the hair and background from the input image 102 (x). The identity loss is represented by equation (9), $$L_{identity}^{real} = 1 - \cos(f_{id}(x), f_{id}(\hat{x})) \tag{9}$$

where $f_{id}(\cdot)$ denotes the feature vector extracted by a face recognition network, e.g., Arcface face recognition network, and $\cos(\cdot, \cdot)$ denotes a cosine similarity.

Further, a landmark loss that measures a distance between an image-plane projection of 3D facial landmark locations in the input image 102 $f_{lmk}^{(1)}(x)$ and the corresponding locations $f_{lmk}^{(2)}(\hat{S})$ in the reconstructed 3D shape model 312A ($\hat{S}$) is defined by following equation (10), $$L_{landmark}^{real}=\|w_1^T[f_{lmk}^{(1)}(x)-f_{lmk}^{(2)}(\hat{S})]\|_2^2$$

$$L_{landmark}^{real}=Pw_1^T[f_{lmk}^{(1)}(x)-f_{lmk}^{(2)}(\hat{S})]P_2^2 \quad (10)$$

where weighting term wl may be included to place more weight on important landmarks such as those contained in the lip outlines, which helps to keep the learned model faithful to the topology of a 3DMM face model (e.g., FLAME).

In some cases, during the training of the neural network 210 for the extraction of the one or multiple physical properties 104A-104D, there may be ambiguities in the extracted one or multiple physical properties 104A-104D. The ambiguities may correspond to relative contributions of color lighting intensities and surface albedo to an RGB appearance of a skin pixel in the images, such as the image 102. To that end, the ambiguity may be overcome based on an albedo regularization loss corresponding to the albedo map 312B. The albedo regularization loss is represented as, $$L_{albedo}^{real}=P(B^TB)^{-1}B^T(\hat{A}-\overline{A})P_2^2$$

$$L_{albedo}^{real}=\|(B^TB)^{-1}B^T(\hat{A}-\overline{A})\|_2^2 \quad (11)$$

The albedo regularization loss (equation 11) may minimize a projection of the albedo map 312B into a principal component space for albedo from a 3DMM that was trained on albedo scans of real face (e.g., the FLAME model), where $\overline{A}$ and B respectively represent mean and basis vectors of the principal component space for the albedo. Additionally or alternatively, to address the same ambiguity, a lighting regularization loss may be used that may be represented as, $$L_{lighting}^{real}=P(\hat{\gamma}-\overline{\gamma})^T\Sigma^{-1}(\hat{\gamma}-\overline{\gamma})P_2^2$$

$$L_{lighting}^{real}=\|(\hat{\gamma}-\overline{\gamma})^T\Sigma^{-1}(\hat{\gamma}-\overline{\gamma})\|_2^2 \quad (12)$$

The lighting regularization loss minimizes a log-likelihood of reconstructed lighting parameters ($\hat{\gamma}$) under a multivariate Gaussian distribution over lighting conditions. The term $\overline{\gamma}$ denotes a sample mean and $\Sigma$ denotes a sample covariance of the reconstructed lighting parameters. Such a multivariate Gaussian distribution over lighting parameters may be obtained using a large dataset of photographic images with known or inferred lighting parameters. Further, the shape code 308A ($\alpha$) and albedo code 308B ($\beta$) are regularized. The regularization of the shape code 308A ($\alpha$) and the albedo code 308B ($\beta$) is represented as, $$L_{reg}^{real}=\lambda_\alpha P\alpha P_2^2+\lambda_\beta P\beta P_2^2$$

$$L_{reg}^{real}=\lambda_\alpha\|\alpha\|_2^2+\lambda_\beta\|\beta\|_2^2 \quad (13)$$

At step 408, the masked rendered face image 318 is combined with the masked hair image 330 to obtain the combined synthetic face image 332. In some embodiments, a hair-manipulation pipeline modifies an appearance of the hair to correspond to the modified pose of the face, which is further explained in FIG. 5.

During refining 410, the combined synthetic face image 332 is further processed by the refiner neural network 334 to generate the refined synthetic face image 336. The combined synthetic face image 332 may not exhibit sufficient variation in regions, such as eye regions, and may lack certain details such as eyelashes, facial hair, and teeth. Furthermore, since face and hair are processed separately, some combined synthetic face images, such as the combined synthetic face image 332, may have blending issues between the face and the hair. To that end, the refiner network 334 generates the photorealistic refined synthetic face image 336 that overcomes the realism gap between the combined synthetic face images 332 and their corresponding original images 102, while making only a minimal change to the reconstructions. The refined synthetic image 336 may be more photorealistic than, but only minimally different from, the combined synthetic face image 332. In some example embodiments, the refiner neural network 334 may correspond to a convolutional neural network architecture, such as a U-Net. The U-Net manipulates the reconstructed combined synthetic image 332 and outputs the final image 336. The refiner neural network 334 may be trained with pairs of original images from a training dataset and reconstructed face images 332.

The refiner neural network 334 may be trained using a set of loss functions. These loss functions may include a perceptual loss that measures the perceptual similarity between the refined synthetic image 336 and the input image 102, an identity loss that measures the identity similarity between the refined synthetic image 336 and the input image 102, and a non-saturating logistic GAN loss to improve the photorealism of the refined synthetic image 336.

At step 412, the reconstructed refined synthetic image 336 is generated as an output, comprising a realistic portrait human face image based on the image 102. In some alternate embodiments, the refined synthetic image 336 may be generated as an anonymized version of a face image in the input image 102. The anonymized version may be generated using anonymization techniques, for example, replacing a face in the input image 102 by a realistic synthetic image, such as the combined rendered face image 332, that may be generated by manipulating some of the one or multiple physical properties 104A-104D of the input image, such as one or both of shape and albedo (which may be manipulated for example by randomly sampling a new shape code 308A and a new albedo code 308B), while preserving others of the one or multiple physical properties such as pose and lightin. The generated anonymized version may enable sharing photographs or video of one or more persons in an input image, such as the input image 102, to a public forum that may restrict a user to share actual face image. In such case, the user may share the anonymized version corresponding to the refined synthetic image 336 in the public forum, while protecting actual identity of the user. At step 414, the process 400 ends.

Figure 5:
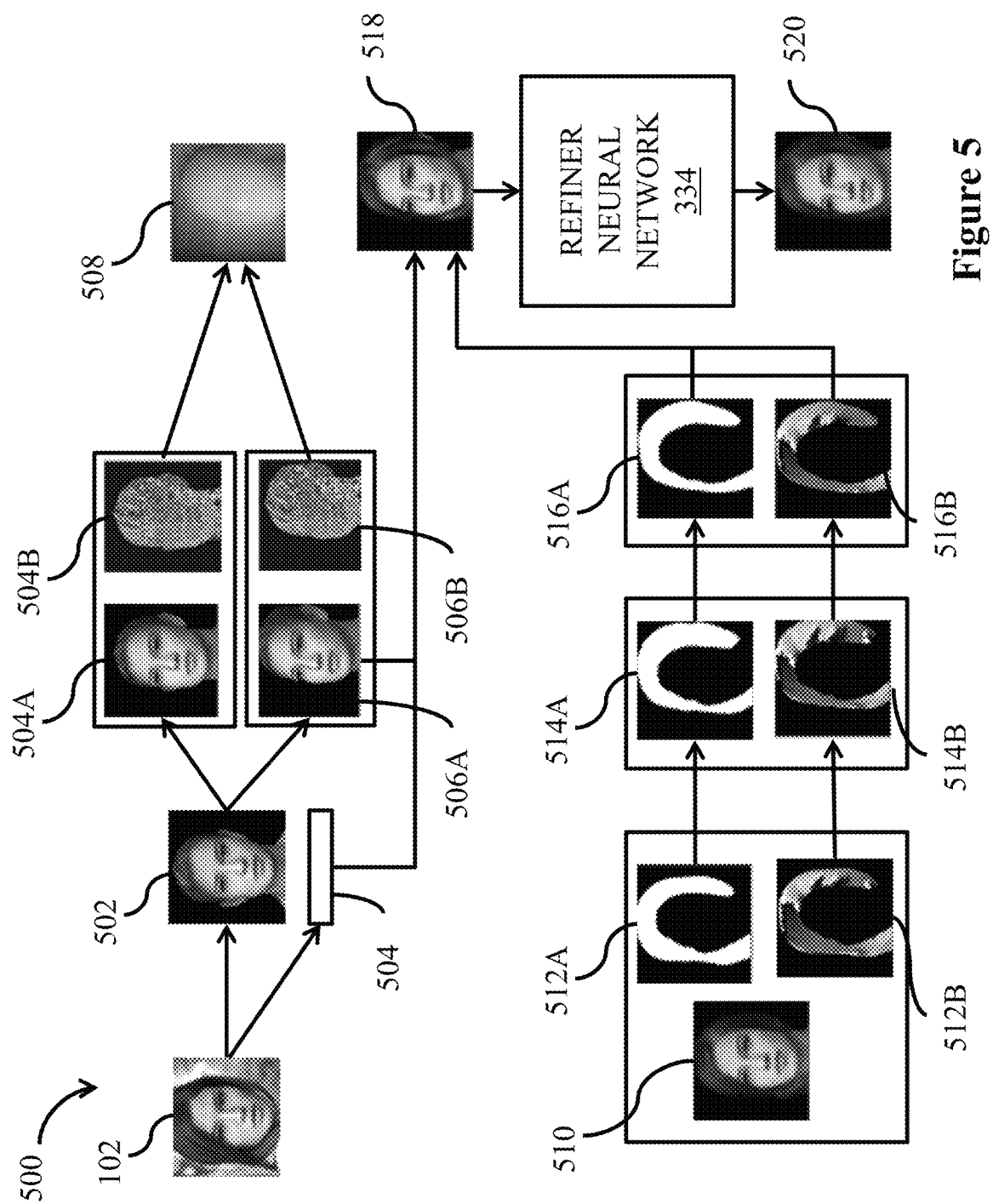
FIG. 5 shows a framework corresponding to a hair-manipulation algorithm, according to one example embodiment of the present disclosure.

FIG. 5 shows a framework corresponding to a hair-manipulation pipeline 500, according to one example embodiment of the present disclosure. In some example embodiments, the hair-manipulation pipeline 500 corresponds to manipulating one or more of the hair image 326, the hair mask 328, and the masked hair image 330. The hair-manipulation algorithm 500 may include a Multi-Input-Conditioned Hair Image GAN (MichiGAN) that processes attributes of hair, such as hair shape, structure, and appearance, from the image 102 in a disentangled manner. The hair shape corresponds to a 2D binary mask of hair region of the image 102. The structure represents a 2D hair strand orientation map. The appearance refers to a global color and style of the hair, which may be encoded as a hair appearance code 504 in a hair appearance latent space.

In some example embodiments, the hair-manipulation pipeline 500 may be used to manipulate the shape and the structure of the hair from an input image 102, without changing the hair color and style from the original image 102. To that end, the hair-manipulation pipeline 500 extracts from the input image 102 a hair code 504 in a hair appearance latent space.

In some example embodiments, the hair manipulation pipeline 500 is coupled with the face reconstruction pipeline 350. The face reconstruction pipeline 350 is used to extract a 3D model 502 of the face in the image 102. The extracted 3D model 502 includes information about the one or multiple physical properties 104A-104D, such as one or more of the shape code 308A, the albedo code 308B, the shape representation 312A, the albedo representation 312B, the pose representation 308C, and the lighting representation 308D.

In some example embodiments, the hair-manipulation pipeline 500 is implemented iteratively, for example, achieving a large pose manipulation by manipulating the pose by several intermediate steps that each achieves a small pose manipulation. The iterative approach for the hair manipulation pipeline 500 may improve an output of photorealism of the hair image 326, in particular for large pose manipulations. From the input image 102, the 3D model 502, and hair code 504 are extracted once and remain constant throughout all the iterations of the hair manipulation pipeline 500.

In each iteration, the hair-manipulation algorithm 500 may use a reference pose 504A from a previous iteration and a target pose 506A. In the first iteration, the reference pose 504A may be the pose 308C that was extracted from the input image 102. In the final iteration, the target pose 506A may be the final desired pose for the final output image. In each intermediate iteration, call it iteration t, the reference pose 504A is equal to the target pose from the previous iteration (i.e., iteration t−1), and the target pose 506A is one step closer to the final desired pose for the final output image. In each iteration, the reference pose 504A and target pose 506A are used to calculate a 2D warp field 508 that represents how the image pixels that correspond to hair may move in 2D as a result of the 3D head model 502 transitioning from the reference pose 504A to the target pose 506A. The 2D warp field 508 may be calculated based on the projection into a 2D image plane (e.g., the 2D image plane of the input image 102) of 3D vertices of the 3D model 502, as the 3D model 502 pose changes from the reference pose 504A to the target pose 506A. For instance, the 3D vertices of the 3D model 502 in the reference pose 504A may be represented by a face mesh 504B, and the 3D vertices of the 3D model 502 in the target pose 506A may be represented by a face mesh 506B, as shown in FIG. 5. The 2D warp field 508 may be obtained by extrapolating the warp field at image locations that are part of the face to image locations that are not part of the face.

A reference image 510 that is input to each iteration is a face image or rendering in the reference pose 504A, while a target image 520 that is output from each iteration is a rendering of the face in the target pose 506A. In a first iteration, the reference image 510 may be the original input image 102. In each intermediate iteration, iteration t, the output image 520 from the previous iteration, t−1, may be used as the input reference image 510 for iteration t. Alternatively or additionally, the combined image 518 from the previous iteration, t−1, may be used as the reference image 510 for iteration t. The warp field 508 is used to warp a reference mask 512A and a reference orientation map 512B of a reference image 510. The reference image 510 along with the reference mask 512A and the reference orientation 512B may be obtained from a previous iteration of the hair-manipulation algorithm 500. The warp field 508 warps the reference mask 512A into a warped mask 514A and the warps the reference orientation map 512B into as a warped orientation map 514B. Each of the warped mask 514A and the warped orientation map 514B is regularized to obtain a corresponding target mask 516A and target orientation 516B, respectively. The hair-manipulation algorithm 500 combines the target mask 516A and the target orientation 516B along with the hair appearance latent space 504 to generate a target image 518. The target image 518 is inputted to the refiner neural network 334 to generate a photorealistic refined target image 520. The refined target image 520 from an iteration t of the hair manipulation algorithm may be used as the reference image 510 in the next iteration, iteration t+1. In a final iteration, the refined target image may correspond to the reconstructed 2D image 336.

Each of the reference pose 504A, the hair appearance code 504B, the face mesh 506A, the face mesh 506B, the 2D warp field 508, the reference image 510, the reference mask 512A, the reference orientation map 512B, the warped mask 514A, the reference orientation map 512B, the warped orientation map 514B, the target mask 516A and target orientation 516B, the target image 518, and the refined target image 520, is updated with every iteration.

Figure 6A:
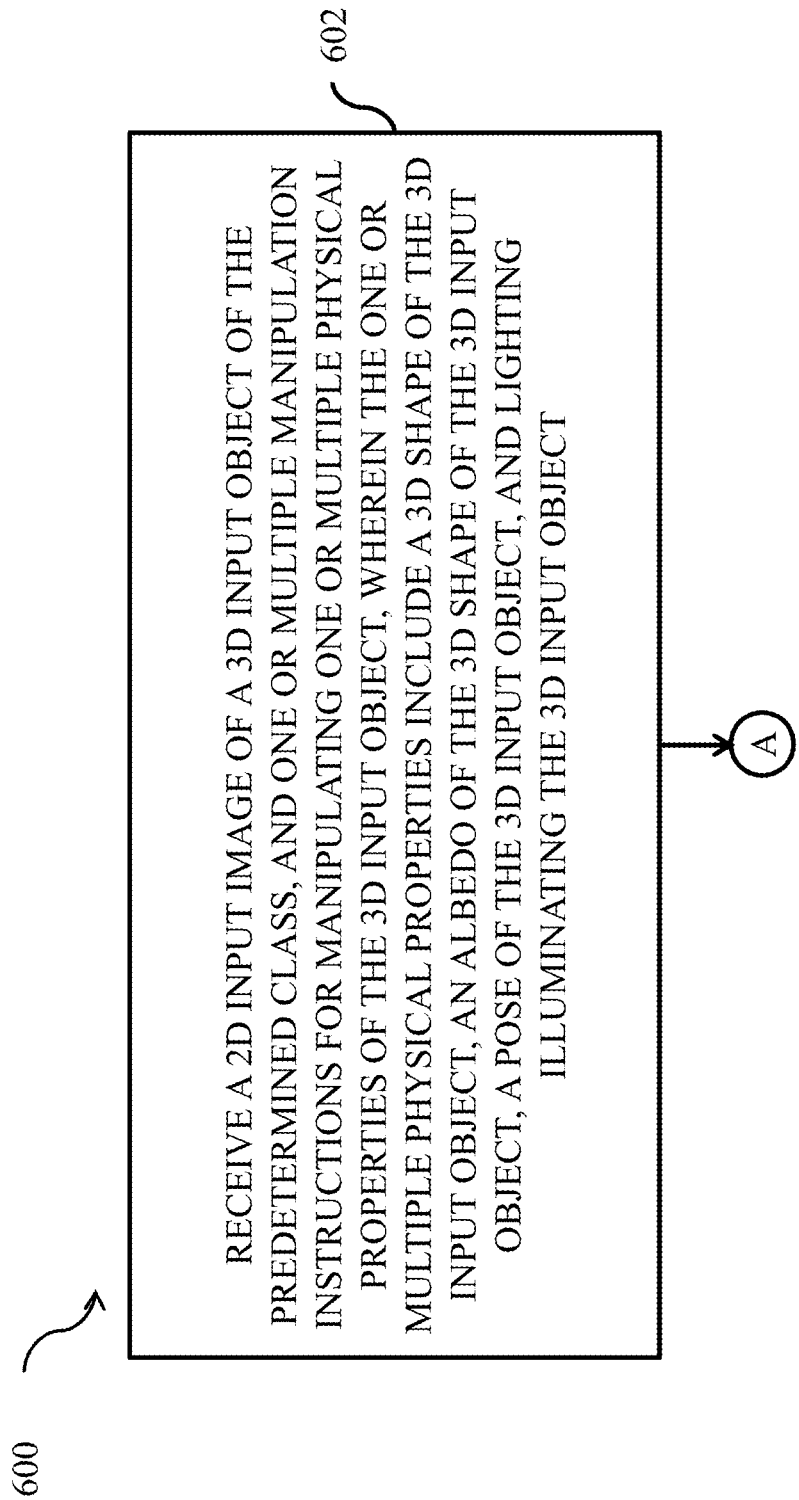
FIGS. 6A and 6B, collectively, show a method for manipulating 2D images of 3D objects of a predetermined class, according to one example embodiment of the present disclosure.
Figure 6B:
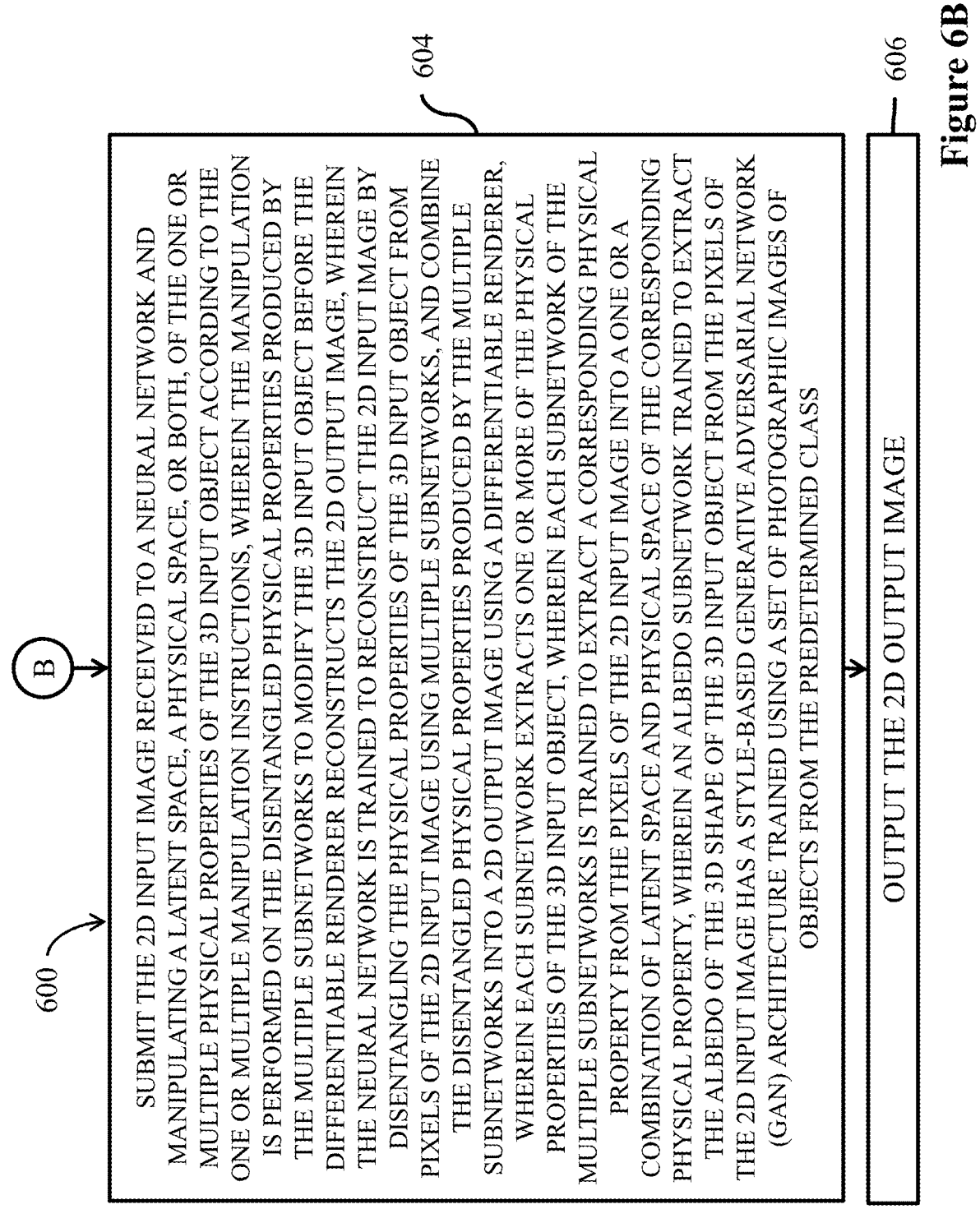

FIGS. 6A and 6B, collectively, show a method 600 for manipulating 2D images of 3D objects of a predetermined class, according to one example embodiment of the present disclosure. The method 600 starts from operation 602 and ends at operation 606, which is performed by the system 200.

At operation 602, the method 600 includes receiving a 2D input image (e.g., the image 102) of a 3D input object of the predetermined class, and one or multiple manipulation instructions for manipulating one or multiple physical properties (e.g., the one or multiple physical properties 104A-104D) of the 3D input object. The one or multiple physical properties include a 3D shape of the 3D input object, an albedo of the 3D input object, a pose of the 3D input object, and lighting illuminating the 3D input object. In some example embodiments, the object is selected from the predetermined class of human faces.

At operation 604, the method 600 includes submitting the 2D input image to a neural network (e.g., the neural network 210) while manipulating the latent space, the physical space, or both, of the one or multiple physical properties of the 3D input object according to the one or multiple manipulation instructions. In some embodiments, the neural network is trained to reconstruct the 2D input image by disentangling the physical properties of the 3D input object from pixels of the 2D input image using multiple subnetworks and combining the disentangled physical properties produced by the multiple subnetworks into a 2D output image using a differentiable renderer. Each of the multiple subnetworks disentangles one or more of the one or multiple physical properties of the 3D object. In some embodiments, there is one subnetwork for each of the physical properties of the 3D input object, such that each subnetwork of the multiple subnetworks is trained to extract a corresponding physical property from the pixels of the 2D input image into a one or a combination of latent space and physical space of the corresponding physical property. The albedo subnetwork trained to extract the albedo of the 3D input object from the pixels of the 2D input image has a style-based generative adversarial network (GAN) architecture trained using a set of photographic images of objects from the predetermined class. The manipulation is performed on the disentangled physical properties produced by the multiple subnetworks to modify the 3D input object before the differentiable renderer reconstructs the 2D output image. In some example embodiments, a plurality of realistic synthetic images may be generated from the 2D images of the 3D objects. The plurality of realistic synthetic images may include variations in the one or multiple physical properties of the poses, expressions, and lighting illumination of the 3D objects.

At operation 606, the method 600 includes outputting the 2D output image. In some example embodiments, the 2D output image may be utilized in at least one of a 3D animation of the 3D object from the 2D input image, a hairstyle trial on a human face of the 2D input image, a reconstruction of a photorealistic synthetic image of the human face from the 2D input image, and a robotic assistance using the reconstructed 2D output image.

Figure 7:
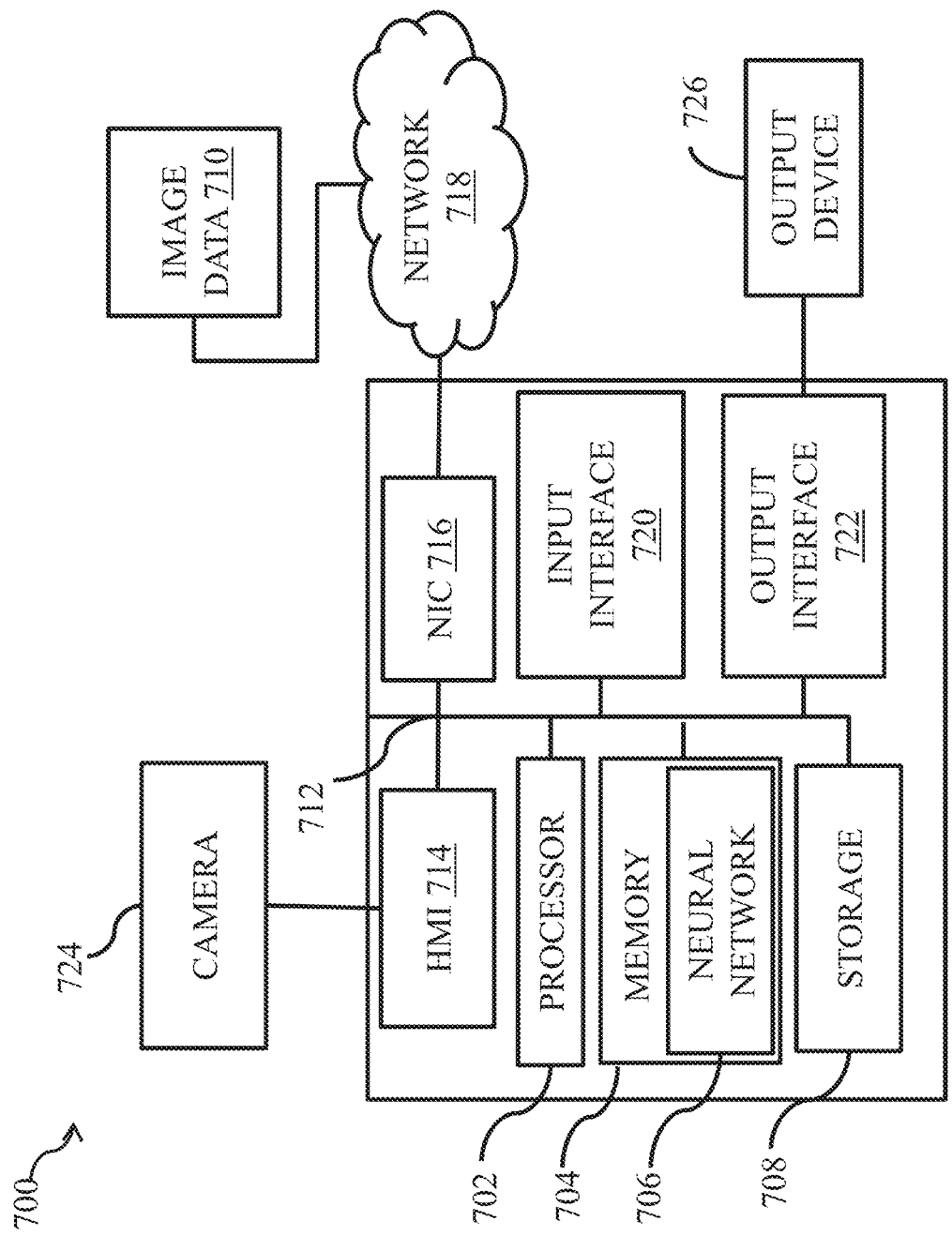
FIG. 7 shows a block diagram of a system for manipulating 2D images of 3D objects of a predetermined class, according to one example embodiment of the present disclosure.

FIG. 7 shows a block diagram of a system 700 for manipulating 2D images of 3D objects of a predetermined class, according to one example embodiment of the present disclosure. The system 700 corresponds to the system 200 of FIG. 2. The system 700 includes a processor 702 and a memory 704. The memory 704 can include random access memory (RAM), read only memory (ROM), flash memory, or any other suitable memory system. The memory 704 is configured to store a neural network 706. The neural network 706 corresponds to the neural network 210. The processor 702 can be a single core processor, a multi-core processor, a computing cluster, or any number of other configurations.

The system 700 also includes an input interface 720 configured to receive a 2D input image of a 3D input object of the predetermined class, and one or multiple manipulation instructions for manipulating one or multiple physical properties of the 3D input object. The one or multiple physical properties correspond to the one or multiple physical properties 104A-104D that include a 3D shape of the 3D input object, an albedo of the 3D shape of the 3D input object, a pose of the 3D input object, and lighting illuminating the 3D input object. Additionally or alternatively, the input interface 720 may receive the 2D images from a camera, such as a camera 724. A few examples of the camera 724 may include an RGBD camera.

The processor 702 is configured to submit the 2D images to the neural network 706 stored in the memory 704. The neural network 706 corresponds to the neural network 210.

In one implementation, a human machine interface (HMI) 714 within the system 700 connects the system 700 to the camera 724. Additionally or alternatively, a network interface controller (NIC) 716 may be adapted to connect the system 700 through a bus 712 to a network 718. In one implementation, the 2D images may be accessed from an image dataset 710 via the network 718. The image dataset 710 may be used pretraining and training the neural network 706.

Additionally or alternatively, the system 700 may include an output device 726 configured to output a final image, such as the reconstructed 2D image 336. The output device 726 may be connected with the system 700 via an output interface 722.

Additionally or alternatively, the system 700 may include a storage 708 configured to store one or multiple physical properties, such as the one or multiple physical properties 104A-104D of the image, reconstructed images of the image (e.g., reconstructed images after the one or multiple physical properties 104A-104D have been manipulated), latent spaces of the one or multiple physical properties 104A-104D, and/or the like.

The data stored in the storage 708 may be accessed through the network 718 for further processing. For instance, the processor 702 may access the storage 708 via the network 718 for utilizing the 2D output image in at least one of a 3D animation of the 3D object from the 2D input image, a hairstyle trial on a human face of the 2D input image, a reconstruction of a photorealistic synthetic image of the human face from the 2D input image, and a robotic assistance using the reconstructed 2D output image.

Figure 8:
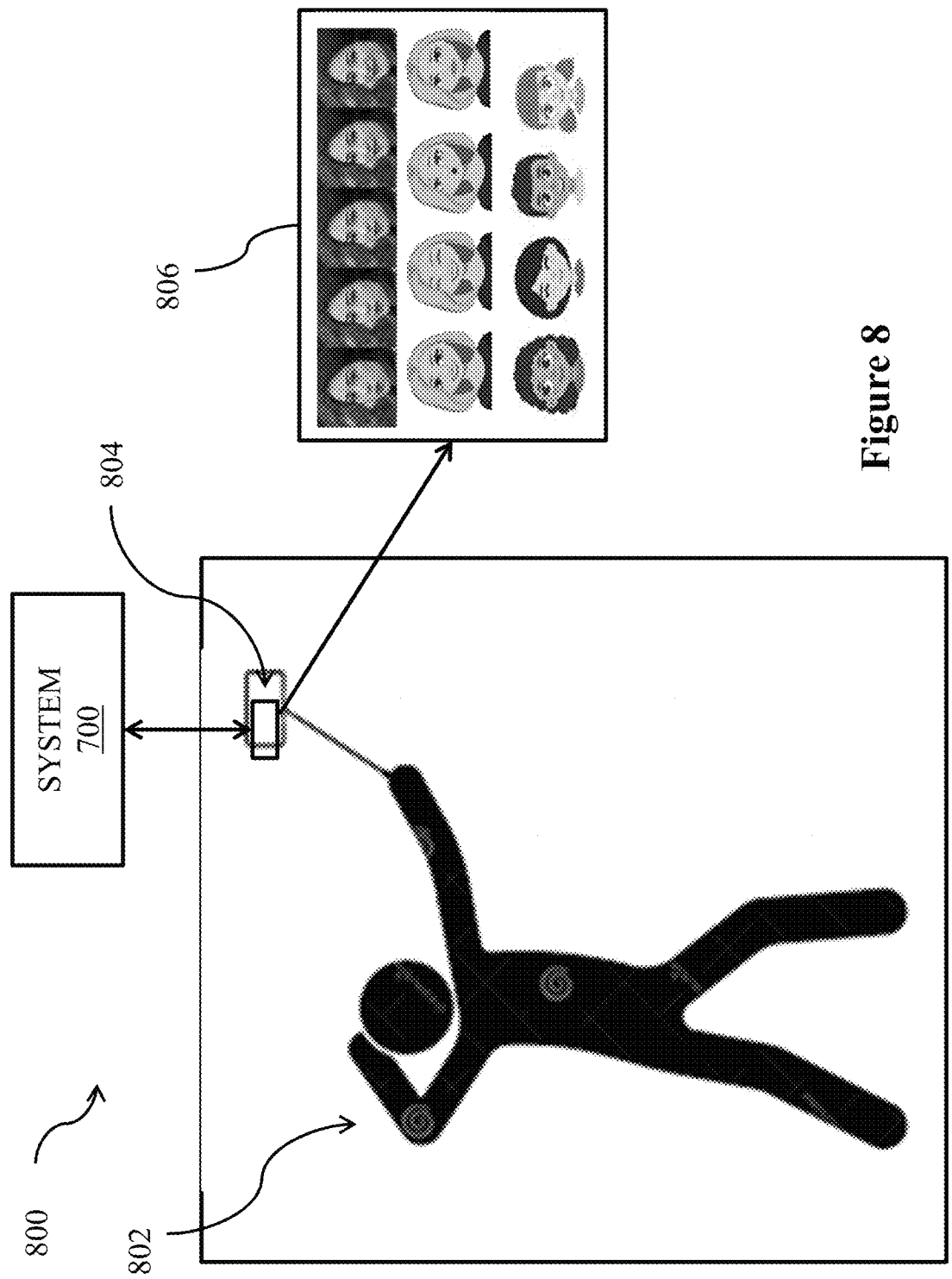
FIG. 8 illustrates a use case scenario for manipulating 2D images of 3D objects of a predetermined class, according to one example embodiment of the present disclosure.

FIG. 8 illustrates a use case scenario 800 for manipulating 2D images of 3D objects of a predetermined class, according to one example embodiment of the present disclosure. The use case scenario 800 corresponds to an application for generating a cartoon or an animated version of a user, such as a user 802 using the system 700. For the generation of such animated version of the user 802, the system 700 may be trained using animated training dataset. In some cases, the animated version of the user 802 may correspond to an anonymized version of the user 802. The application may be installed in a user device 804. In an illustrative example scenario, the user 802 may capture a 2D image that includes a frontal face of the user 802. The 2D image may be shared to the system 700 via a network, such as the network 718. The system 700 processes the 2D image of the user 802. After the processing, the system 700 generates one or more animated versions 806. The one or more animated versions 806 may include face images of the user 802 in different poses and/or expressions, different animated pictures of the user 802 and/or the like.

Figure 9:
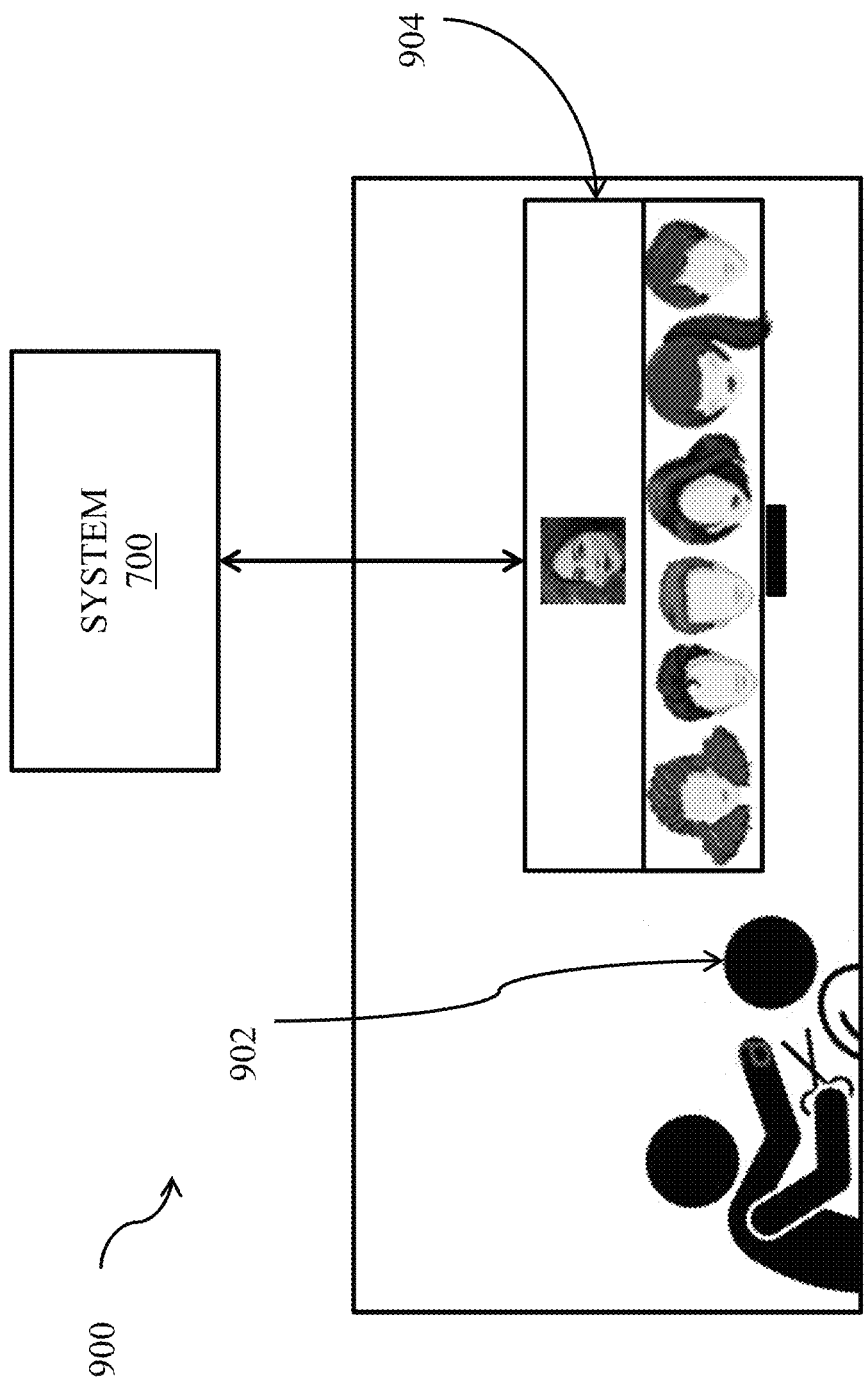
FIG. 9 illustrates a use case scenario for manipulating 2D images of 3D objects of a predetermined class, according to another example embodiment of the present disclosure.

FIG. 9 illustrates a use case scenario 900 for manipulating 2D images 3D objects of a predetermined class, according to another example embodiment of the present disclosure. In the use case scenario 900, a 2D image of a user, such as a user 902 may be used for trying out different hairstyle looks in a realistic manner. In an illustrative scenario, a 2D face image of the user 902 is shared to an electronic device 904. In some cases, the electronic device 904 may be remotely connected with the system 700. In some other cases, the system 700 may be embedded within the electronic device 904. The electronic device 904 sends the 2D image of the user 902 to the system 700. The system 700 generates different images of the user 902 with corresponding different hairstyles in a photorealistic manner, such that even when the user 902 changes different head poses, the different images with the corresponding different hairstyles remain realistic. The user 902 may select the desired hairstyle from the generated different images with different hairstyles.

Figure 10:
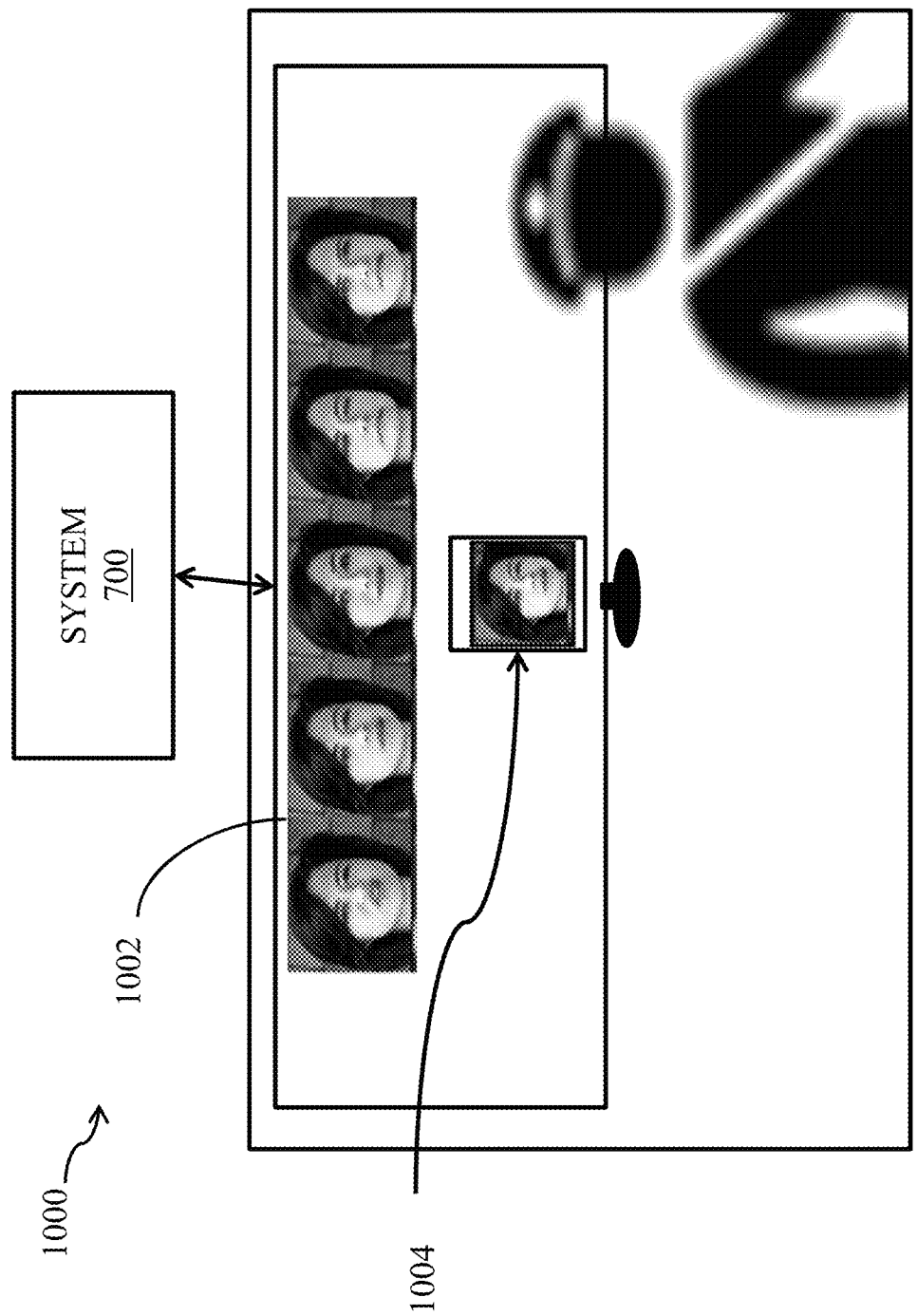
FIG. 10 illustrates a use case scenario for manipulating 2D images of 3D objects of a predetermined class, according to another example embodiment of the present disclosure.

FIG. 10 illustrates a use case scenario 1000 for manipulating 2D images 3D objects of a predetermined class, according to yet another example embodiment of the present disclosure. The use case scenario 1000 corresponds to a reconstruction of a photorealistic synthetic image of the human face from a 2D input image. In an illustrative example scenario, a surveillance camera may capture a 2D image of a person. The captured 2D image of the person may be a side view of person's face. In such scenario, the 2D image may be shared to the system 700. The system 700 may generate different images 1002 of the person from different angles of view, different poses and/or expressions of the person. The different images 1002 may include images with a reconstructed frontal view of the person, which may be used to track down a suspect by a security official. For instance, an image 1004 with the frontal view of the person may be selected from the different images 1002.

FIG. 11 illustrates a use case scenario 1100 for manipulating 2D images of 3D objects of a predetermined class, according to yet another example embodiment of the present disclosure. The use case scenario 1100 corresponds to a robotic system using a reconstructed 2D output image. Such robotic system may be used in an industrial automation application for picking objects from a conveyor belt 1104. There may be times that lighting condition on the object may be poor, which may hinder functionality of the robotic system to pick the objects from the conveyer belt 1104. In such poor lighting conditions, the system 700 may generate reconstructed images of objects, such as the object 1102 under the poor light conditions, and aid the robotic system in picking the object 1102 from the conveyor belt 1104. To that end, a 2D image of a 3D object, such as object 1102, may be captured using a device 1106. The device 1106 may include a camera. The 2D image of the object 1102 is shared from the device 1106 to the system 700 for further processing. The system 700 may reconstruct the 2D object with manipulated lighting illumination to aid the robotic system in picking the object 1104 from the conveyor belt 1104.

In this manner, the system 700 may be used for manipulating 2D images for 3D objects using a neural network trained in an unsupervised manner. The unsupervised training of the neural network precludes the need for 3D data, which may be difficult and/or expensive to obtain, and improves overall processing and storage efficiency. Further, such manipulation of the 2D images helps in achieving photorealistic images, in an efficient and feasible manner.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, it can be understood by one of ordinary skill in the art that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An image processing system for manipulating two-dimensional (2D) images of three-dimensional (3D) objects of a predetermined class, the image processing system comprising:
   an input interface configured to receive a 2D input image of a 3D input object of the predetermined class, and one or multiple manipulation instructions for manipulating one or multiple physical properties of the 3D input object, wherein the one or multiple physical properties include a 3D shape of the 3D input object, an albedo of the 3D input object, a pose of the 3D input object, and lighting illuminating the 3D input object;
   a memory configured to store a neural network trained to reconstruct the 2D input image by disentangling the one or multiple physical properties of the 3D input object from pixels of the 2D input image using multiple subnetworks and combining the disentangled one or multiple physical properties produced by the multiple subnetworks into a 2D output image using a differentiable renderer, wherein each subnetwork extracts one or more of the one or multiple physical properties of the 3D input object, and each subnetwork of the multiple subnetworks is trained to extract a corresponding physical property from the pixels of the 2D input image into a one or a combination of latent space and physical space of the corresponding physical property, wherein an albedo subnetwork trained to extract the albedo of the 3D input object from the pixels of the 2D input image has a style-based generative adversarial network (GAN) architecture trained using a set of photographic images of objects from the predetermined class;

a processor configured to submit the 2D input image received from the input interface to the neural network and manipulate the latent space, the physical space, or both, of the one or multiple physical properties of the 3D input object according to the one or multiple manipulation instructions, wherein the manipulation is performed on the disentangled one or multiple physical properties produced by the multiple subnetworks to modify the 3D input object before the differentiable renderer reconstructs the 2D output image; and an output interface configured to output the 2D output image.

2. The image processing system of claim 1, wherein the neural network further includes a refiner neural network trained to enhance a visual representation of the modified 3D input object in the 2D output image.

3. The image processing system of claim 1, wherein the objects are selected from a predetermined class of human faces.

4. The image processing system of claim 3, wherein the processor is configured to execute a hair-manipulation pipeline for manipulating hair of the human faces separately from the manipulation of the one or multiple physical properties of the human faces.

5. The image processing system of claim 4, wherein the processor is configured to execute the hair-manipulation pipeline to modify a representation of hair in the 2D output image corresponding to manipulation of a pose of a human face in the 2D input image, wherein the hair-manipulation pipeline modifies an appearance of the hair to correspond to the modified pose of the human face.

6. The image processing system of claim 1, wherein the neural network is pretrained using a dataset comprising a plurality of synthetically generated human face images.

7. The image processing system of claim 1, wherein the processor is configured to generate a plurality of realistic synthetic images from the 2D images of the 3D objects, wherein the plurality of realistic synthetic images comprises variations in the one or multiple physical properties of the poses, expressions, and lighting illumination of the 3D objects.

8. The image processing system of claim 1, wherein the processor is configured to generate a mask image for the 2D input image using a semantic segmentation network.

9. The image processing system of claim 1, wherein the 2D output image is utilized in at least one of a 3D animation of the 3D object from the 2D input image, a hairstyle trial on a human face of the 2D input image, a reconstruction of a photorealistic synthetic image of the human face from the 2D input image, and a robotic system using the reconstructed 2D output image.

10. The image processing system of claim 1, wherein the 2D output image is used as at least one of an anonymized version of the 2D input image and a training data sample image for a different system.

11. A method for manipulating two-dimensional (2D) images of three-dimensional (3D) objects of a predetermined class, the method comprising:

receiving a 2D input image of a 3D input object of the predetermined class, and one or multiple manipulation instructions for manipulating one or multiple physical properties of the 3D input object, wherein the one or multiple physical properties include a 3D shape of the 3D input object, an albedo of the 3D shape of the 3D input object, a pose of the 3D input object, and lighting illuminating the 3D input object;

submitting the 2D input image to a neural network and manipulating the latent space, the physical space, or both, of the one or multiple physical properties of the 3D input object according to the one or multiple manipulation instructions, wherein the manipulation is performed on the disentangled one or multiple physical properties produced by multiple subnetworks to modify the 3D input object before a differentiable renderer reconstructs the 2D output image, wherein the neural network is trained to reconstruct the 2D input image by disentangling the one or multiple physical properties of the 3D input object from pixels of the 2D input image using the multiple subnetworks, and combine the disentangled physical properties produced by the multiple subnetworks into a 2D output image using the differentiable renderer, wherein each subnetwork extracts one or more of the physical properties of the 3D input object, wherein each subnetwork of the multiple subnetworks is trained to extract a corresponding physical property from the pixels of the 2D input image into a one or a combination of latent space and physical space of the corresponding physical property, wherein an albedo subnetwork trained to extract the albedo of the 3D shape of the 3D input object from the pixels of the 2D input image has a style-based generative adversarial network (GAN) architecture trained using a set of photographic images of objects from the predetermined class; and outputting the 2D output image.

12. The method of claim 11, further comprising enhancing a visual representation of the modified 3D input object in the 2D output image using a refiner neural network of the neural network.

13. The method of claim 11, wherein the objects correspond to a predetermined class of human faces.

14. The method of claim 13, further comprising:
executing a hair-manipulation pipeline for manipulating hair of the human faces separately from the manipulating of the physical properties of the human faces.

15. The method of claim 14, further comprising:
executing the hair-manipulation algorithm to modify the representation of the hair in the 2D output image corresponding to manipulation of a pose of an input human face in the 2D input image, wherein the hair-manipulation algorithm is trained to synchronize an appearance of the hair with the modified pose of the input human face.

16. The method of claim 11, further comprising: pretraining the neural network using a dataset comprising synthetically generated human face images.

17. The method of claim 11, further comprising: generating a plurality of realistic synthetic images from the 2D images of the 3D objects, wherein the plurality of realistic synthetic images comprises variations in the one or multiple physical properties of the poses, expressions, and lighting illumination of the 3D objects.

18. The method of claim 11, further comprising: generating a mask image for the 2D input image using a semantic segmentation network.

19. The method of claim 11, further comprising: utilizing the 2D output image in at least one of a 3D animation of the 3D object from the 2D input image, a hairstyle trial on a human face of the 2D input image, a reconstruction of a photorealistic synthetic image of the human face from the 2D input image, and a robotic system using the reconstructed 2D output image.

20. The method of claim 11, further comprising: utilizing the 2D output image as at least one of an anonymized version of the input image and a training data sample image for a different method.

* * * * *